United States Patent
Aoyama et al.

(10) Patent No.: US 8,195,586 B2
(45) Date of Patent: Jun. 5, 2012

(54) DATA PROCESSING APPARATUS, DATA PROCESSING METHOD, AND COMPUTER PROGRAM FOR SETTING TARGETS IN A RANGE AND TAKING ACTION TO ATTAIN THE TARGET

(75) Inventors: Kazumi Aoyama, Saitama (JP); Masato Ito, Tokyo (JP); Kuniaki Noda, Tokyo (JP)

(73) Assignee: Sony Corporation, Tokyo (JP)

( * ) Notice: Subject to any disclaimer, the term of this patent is extended or adjusted under 35 U.S.C. 154(b) by 585 days.

(21) Appl. No.: 12/413,004

(22) Filed: Mar. 27, 2009

(65) Prior Publication Data

US 2009/0299933 A1 Dec. 3, 2009

(30) Foreign Application Priority Data

May 28, 2008 (JP) ................................. 2008-139295

(51) Int. Cl.
*G06F 15/18* (2006.01)
*G06F 17/00* (2006.01)
(52) U.S. Cl. ................. 706/15; 706/16; 706/25; 706/45
(58) Field of Classification Search .................... None
See application file for complete search history.

(56) References Cited

U.S. PATENT DOCUMENTS 5,812,992 A * 9/1998 de Vries .......................... 706/25

FOREIGN PATENT DOCUMENTS

| JP | 2002-239952 | 8/2002 |
| JP | 2006-162898 | 6/2006 |
| JP | 2006-293442 | 10/2006 |

OTHER PUBLICATIONS

Jun Tani "Model-Based Learning for Mobile Robot Navigation from the Dynamical Systems Perspective", IEEE Transactions on Systems, Man, and Cybernetics, vol. 26, No. 3, Jun. 1996, pp. 421-436.
Jun Tani, "On the Dynamics of Robot Exploration Learning", Congnitive Systems Research, vol. 3, No. 3, 2002, 22 pages.

* cited by examiner

*Primary Examiner* — Alan Chen
(74) *Attorney, Agent, or Firm* — Oblon, Spivak, McClelland, Maier & Neustadt, L.L.P.

(57) ABSTRACT

A data processing apparatus includes: predicting means for calculating a prediction value of time series data with respect to input of the time series data using a prediction model for predicting the time series data; determining means for determining a target value of the time series data on the basis of the prediction value of the time series data; error calculating means for calculating an error of the prediction value relative to the target value; and retrieving means for retrieving error reduction data as input of the time series data to the prediction model for reducing the error of the prediction value.

15 Claims, 14 Drawing Sheets

DATA PROCESSING APPARATUS, DATA PROCESSING METHOD, AND COMPUTER PROGRAM FOR SETTING TARGETS IN A RANGE AND TAKING ACTION TO ATTAIN THE TARGET

BACKGROUND OF THE INVENTION

1. Field of the Invention

The present invention relates to a data processing apparatus, a data processing method, and a computer program, and, more particularly to a data processing apparatus, a data processing method, and a computer program for allowing an agent such as a robot to set a target in a generalizable range and quickly take an action for attaining the target.

2. Description of the Related Art

For example, as a method of causing an agent that can act such as a virtual character displayed on a display or a robot in a real world to adapt to an environment and act, there is a method with which a designer of the agent programs actions of the agent assuming an environment.

However, with the method of programming actions of the agent, the agent may be unable to take actions not programmed by the designer.

Therefore, there is proposed a method of providing, in an agent, a learning device that learns actions of the agent according to the environment around the agent and acquiring actions adapted to the environment using the learning device (see, for example, JP-A-2006-162898).

As a method of causing the learning device to acquire actions, for example, there is a method of explicitly and directly teaching actions to the learning device offline. "Explicitly and directly teaching actions" means, for example, an action of a user placing a ball in front of a robot as an agent and directly moving arms of the robot to roll the ball to the left and right.

However, with the method of explicitly and directly teaching actions, it is difficult to adapt the robot to a dynamic environment and the like (including an unknown (unlearned) environment) that change every moment.

To allow the agent to take actions adapted to the dynamic environment and the like, (the learning device of) the agent needs to appropriately collect new learning data for learning actions and perform learning using the learning data to acquire a new action.

In other words, the agent itself needs to repeatedly autonomously take a new action and learn a result of the action to thereby acquire a model for taking actions adapted to an environment.

As a method with which an agent autonomously acquires a new action, there is a method of searching for an action such that sensor data representing a state of an environment, which is obtained by sensing the environment with a sensor for sensing a physical quantity, reaches a target value and learning a result of the action (see, for example, Toshitada Doi, Masahiro Fujita, and Hideki Shimomura, "Intelligence Dynamics 2, Intelligence having a Body, Coevolution of Brain Science and Robotics", Springer Japan KK, 2006) (Non-Patent Document 1).

With the method described in Non-Patent Document 1, a target value of sensor data is determined and the agent repeatedly searches for an action in which the sensor data reaches the target value. Consequently, the agent autonomously develops (a model learned by) a learning device and acquires a new action in which a target value is obtained.

To acquire (a model for taking) a new action, (the learning device of) the agent needs to have a function of learning new learning data for taking the new action (a function for performing so-called additional learning).

Further, to acquire a new action, the agent needs to have a first function of searching for an action for attaining an unknown target, i.e., an action in which sensor data reaches a target value and a second function of determining a target necessary for the agent to expand actions, i.e., determining a target value of sensor data.

As a representative method of realizing the first function, there is reinforcement learning. In the reinforcement learning, in general, a $\epsilon$-greedy method is used to search for an action. In the $\epsilon$-greedy method, in the search for an action, a random action is selected at a certain probability $\epsilon$ and a best action in the past (e.g., an action in which sensor data closest to a target value is obtained) is selected at a probability 1-$\epsilon$.

Therefore, in the $\epsilon$-greedy method, the search for a new action is performed in so-called random search.

In the search for an action, action data for causing the agent to act is generated and the agent takes an action according to the action data. The action data is, for example, data for driving an actuator that moves parts of a body such as arms and legs of a robot. The action data includes data used for causing the agent to take various actions such as data for causing a light source equivalent to an eye to emit light and data for generating a composite tone as sound.

Concerning an agent that performs only a simple action, action data for causing the agent to act is discrete values that take a small number of values.

For example, concerning an agent that moves to a destination while selecting one of two paths selectable at a branch point of the paths, action data for the agent to take an action for selecting a path at the branching point is, for example, discrete values that take two values, 0 and 1, representing the two paths.

Besides, action data for causing the agent that performs only a simple action to act is, for example, data (a vector) with a small number of a dimension and is time series data with small data length.

On the other hand, action data for causing an agent that can take a complicated action to act is discrete values that take a large number of values or continuous values. Further, the action data for causing the agent that can take a complicated action to act is data with a large number of a dimension and is time series data with large data length.

When action data is the continuous values (including the discrete values that take a large number of values), the data with a large number of a dimension, or the time series data with large data length, in the random search performed by the $\epsilon$-greedy method, extremely many trials (searches for actions) are necessary until the agent becomes capable of taking an action for attaining a target.

In the Non-Patent Document 1, a target value of sensor data is determined at random and the search for an action in which sensor data of the target value is obtained (action data) is performed according to a retrieval algorithm called A*.

In the Non-Patent Document 1, a method of setting a target at random is adopted as a method of realizing the second function for performing determination of a target necessary for the agent to expand actions, i.e., determination of a target value of sensor data.

However, when a target is set at random, in some case, a target that the agent may be unable to attain is set. In an attempt to attain such a target that the agent may be unable to attain, virtually, useless search (search for an action) could be performed.

In other words, when a target is set at random, a target exceeding a generalizable range by a model of the agent may be set.

Further, there is provided a method of predicting an error of a prediction value of sensor data and realizing, using a prediction value of the error as a part of input to a function approximator as a model for learning an action, a curiosity motive for searching for a new action with a target of setting the prediction value of the error to a maximum value 1.0 (see, for example, J. Tani, "On the Dynamics of Robot Exploration Learning," Cognitive Systems Research, Vol. 3, No. 3, pp. 459-470, (2002)).

However, when it is the target to set the prediction value of the error to the maximum value 1.0, i.e., when a target value is set to a certain fixed value, the target value may be a value exceeding performance of generalization of the function approximator.

For example, when learning of the function approximator is performed by using time series data of two patterns as learning data, in the function approximator, memories of the two patterns interfere with each other and the memories are shared. As a result, the function approximator can generate time series data not learned in the past, for example, time series data of an intermediate pattern of the two patterns used as the learning data.

The ability for sharing memories of plural patterns of the function approximator is generalization. According to the generalization, it is possible to generate time series data of a pattern similar to a pattern used as the learning data.

However, even the function approximator having the generalization ability may not be able to generate time series data of a pattern exceeding performance of the generalization, i.e., for example, time series data of a pattern completely different from the pattern used as the learning data.

Therefore, when the target value is a value exceeding the performance of the generalization of the function approximator, it is difficult to perform search using the generalization of the function approximator. As a result, it may be difficult to search for an action of moving closer to the target value. The same holds true when a target is set at random as described in Non-Patent Document 1.

There is proposed an agent that acts, in order to expand an action range of the agent, to increase an error from a memory of an action in the past and, on the other hand, reduce an error from a memory of an action for returning to a home position such that the agent does not enter an unknown area too deeply (see, for example, JP-A-2002-239952).

The agent described in JP-A-2002-239952 predicts sensor data and action data that would be obtained if the agent acts according to action plan data and calculates a reward with respect to the sensor data and the action data. Action plan data for taking an action is selected out of action plan data stored in the agent in advance. The agent acts according to the selected action plan data.

Therefore, it is difficult for the agent described in JP-A-2002-239952 to take an action other than actions conforming to the action plan data stored in advance.

SUMMARY OF THE INVENTION

As explained above, to allow the agent to acquire a new action (take a new action), the agent needs to have the first function of searching for an action for attaining an unknown target and the second function of determining a target necessary for the agent to expand actions.

When the search for an action as the first function is performed by random search, extremely many trials (searches for actions) are necessary until the agent becomes capable of taking an action for attaining a target.

When the determination of a target as the second function is performed by determining a target value at random or determining the target value as a certain fixed value, it may be difficult to search for an action of moving closer to the target value.

Therefore, it is desirable to allow an agent such as a robot to set a target in a generalizable range and quickly take an action for attaining the target.

According to an embodiment of the present invention, there is provided a data processing apparatus including predicting means for calculating a prediction value of time series data with respect to input of the time series data using a prediction model for predicting the time series data; determining means for determining a target value of the time series data on the basis of the prediction value of the time series data; error calculating means for calculating an error of the prediction value relative to the target value; and retrieving means for retrieving error reduction data as input of the time series data to the prediction model for reducing the error of the prediction value.

According to another embodiment of the present invention, there is provided a computer program for causing a computer to function as the data processing apparatus.

According to still another embodiment of the present invention, there is provided a data processing method including the steps of: calculating a prediction value of time series data with respect to input of the time series data using a prediction model for predicting the time series data; determining a target value of the time series data on the basis of the prediction value of the time series data; calculating an error of the prediction value relative to the target value; and retrieving error reduction data as input of the time series data to the prediction model for reducing the error of the prediction value.

In the embodiments of the present invention, a prediction value of time series data is calculated with respect to input of the time series data by using a prediction model for predicting the time series data. A target value of the time series data is determined on the basis of the prediction value of the time series data. An error of the prediction value relative to the target value is calculated. Error reduction data as input of the time series data to the prediction model for reducing the error of the prediction value is retrieved.

The computer program can be provided by transmitting the computer program via a transmission medium or recording the computer program in a recording medium.

The data processing apparatus may be an independent apparatus or may be an internal block configuring one apparatus.

According to the embodiments of the present invention, an agent such as a robot can set a target and take an action for attaining the target. In particular, the agent can set a target in a generalizable range and quickly take an action for attaining the target.

DESCRIPTION OF THE PREFERRED EMBODIMENTS

Embodiments of the present invention are explained in detail below with reference to the accompanying drawings.

Figure 1:
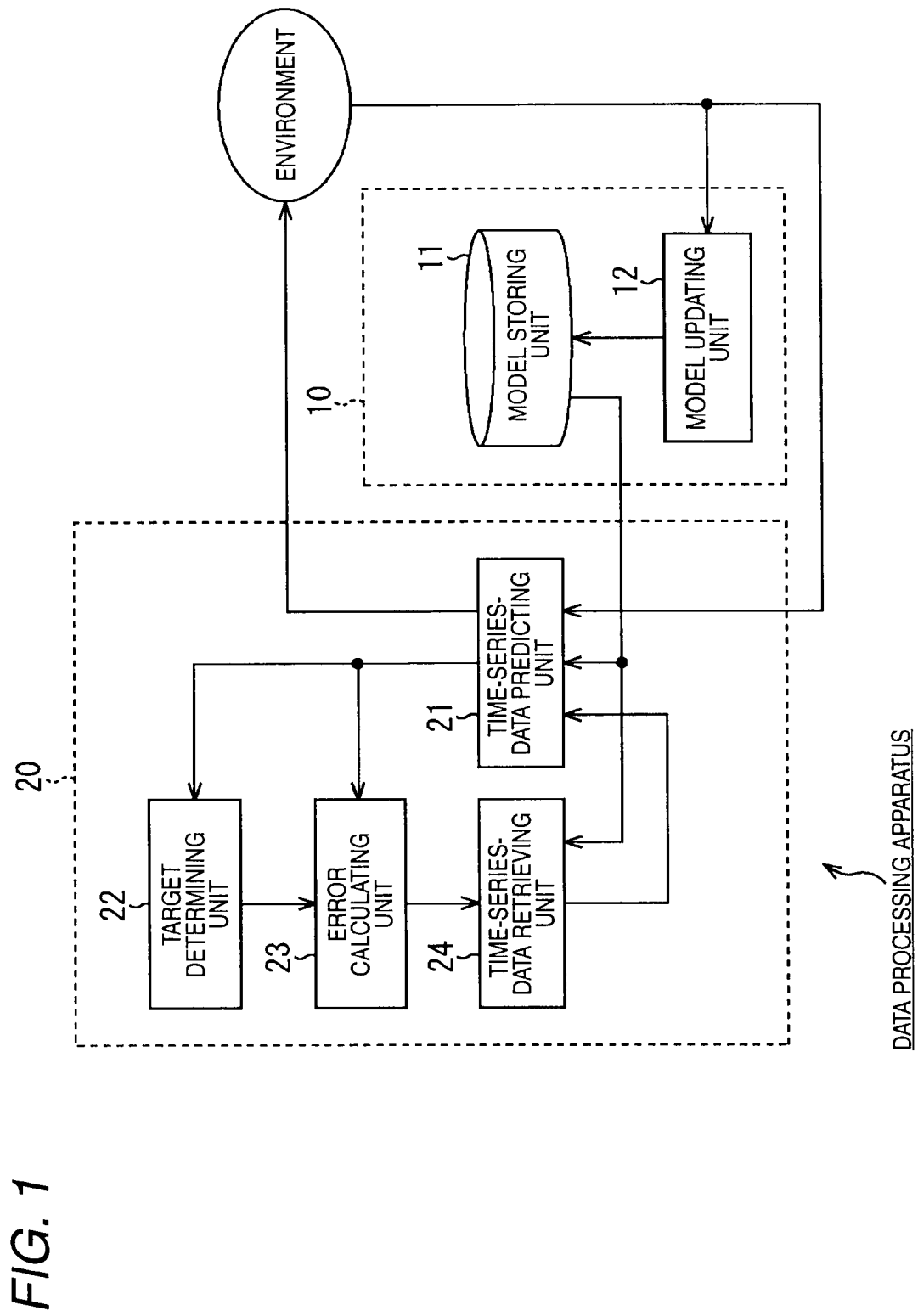
FIG. 1 is a block diagram of a configuration example of a data processing apparatus according to an embodiment of the present invention.

FIG. 1 is a block diagram of a configuration example of a data processing apparatus according to an embodiment of the present invention.

In FIG. 1, the data processing apparatus includes a learning device 10 and a generating device 20 and configures a part of a control block for controlling an agent such as a robot in a real world.

In FIG. 1, the learning device 10 and the generating device 20 configure the data processing apparatus. However, for example, it is also possible to configure the data processing apparatus only with the generating device 20 and configure the learning device 10 as another data processing apparatus.

The learning device 10 includes a model storing unit 11 and a model updating unit 12. The learning device 10 performs, using time series data, update of parameters of a prediction model as learning of the prediction model.

The model storing unit 11 stores, as a model for the agent to take an action, (model parameters as parameters of) the prediction model for predicting the time series data.

As the prediction model, it is possible to adopt a function approximator that approximates functions, for example, an NN (Neural Network) such as an RNN (Recurrent Neural Network) and an SVR (Support Vector Regression).

In this embodiment, for example, the RNN is adopted as the prediction model. When the RNN is adopted as the prediction model, weight attached to input from another node in a node corresponding to a neuron configuring the RNN is a parameter of a model of the RNN.

Figure 8:
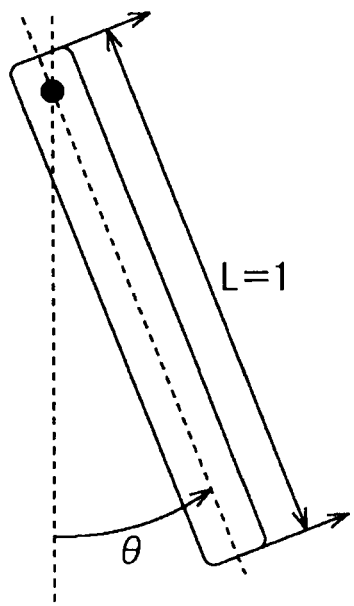
FIG. 8 is a diagram of a bar-like pendulum as an agent.

Concerning the RNN as the prediction model, it is assumed that learning performed by using learning data prepared in advance for the agent to take a certain basic action (e.g., an action for moving to draw a straight line, a circle, a figure 8, or the like) is already finished.

Time series data including sensor data representing a state of an environment, which is obtained by sensing the environment with a sensor (not shown) for sensing a physical quantity, and action data for causing the agent to act is supplied to the model updating unit 12.

The agent has the sensor for sensing a physical quantity of, for example, an environment in which the agent itself is present. Time series data as sensor data representing a state of the environment or the like output by the sensor is supplied to the model updating unit 12.

As the sensor, it is possible to adopt a sensor for sensing a necessary physical quantity in an environment such as a camera for photographing an image, a microphone for collecting sound, or a sensor for measuring a distance.

Further, as the sensor, it is also possible to adopt a sensor for sensing a state of the agent, for example, a rotation angle, angular velocity, and the like of an actuator (not shown) for driving regions of the agent. In this case, the sensor data includes the rotation angle, the angular velocity, and the like of the actuator of the agent.

As explained above, the time series data supplied to the model updating unit 12 includes the action data in addition to the sensor data.

As explained later, the action data is generated by the generating device 20 and supplied to the actuator and the like configuring the agent. The time series data supplied to the model updating unit 12 includes the action data.

The model updating unit 12 sets the time series data supplied thereto as learning data used for learning of a prediction model and performs, using the learning data, update of a model parameter of the prediction model as learning of the prediction model stored in the model storing unit 11.

The prediction model stored in the model storing unit 11 and learned by the model updating unit 12 is referred to by a time-series-data predicting unit 21 and a time-series-data retrieving unit 24 explained later configuring the generating device 20.

The generating device 20 includes the time-series-data predicting unit 21, a target determining unit 22, an error calculating unit 23, and the time-series-data retrieving unit 24. The generating unit 20 retrieves error reduction data as input of the time series data to the prediction model for reducing an error of a prediction value of the time series data, calculates a prediction value of the time series data using the error reduction data, and supplies the prediction value to the actuator of the agent and the model updating unit 12 of the learning device 10.

The time series data including the sensor data and the action data, which is the same as the time series data supplied to the model updating unit 12, is supplied (input) to the time-series-data predicting unit 21.

Time series data as error reduction data is supplied (input) to the time-series-data predicting unit 21 from the time-series-data retrieving unit 24.

The time-series-data predicting unit 21 calculates (predicts) a prediction value of the time series data with respect to input of the time series data using the prediction model stored in the model storing unit 11 and supplies the prediction value to the target determining unit 22, the error calculating unit 23, the actuator of the agent, and the model updating unit 12 of the learning device 10.

The target determining unit 22 determines a target value of the time series data on the basis of the prediction value of the time series data from the time-series-data predicting unit 21 and supplies the target value to the error calculating unit 23.

The target determining unit 22 determines, on the basis of a prediction value of the sensor data included in the prediction value of the time series data from the time-series-data predicting unit 21, a target value of the sensor data and supplies the target value to the error calculating unit 23.

As a method of determining the target value of the sensor data on the basis of the prediction value of the sensor data, for example, there is a method of calculating a predetermined function that takes as an argument the prediction value of the sensor data and determining a function value, which is a result of the calculation, as a target value.

The error calculating unit 23 calculates an error of the prediction value of the time series data supplied from the time-series-data predicting unit 21 relative to the target value of the time series data supplied from the target determining unit 22 and supplies the error to the time-series-data retrieving unit 24.

The error calculating unit 23 calculates an error of the prediction value of the sensor data included in the time series data relative to the target value of the sensor data and supplies the error to the time-series-data retrieving unit 24.

The time-series-data retrieving unit 24 retrieves error reduction data as input of the time series data to the prediction model for reducing the error of the prediction value from the error calculating unit 23 and supplies the error reduction data to the time-series-data predicting unit 21.

As explained above, the time-series-data predicting unit 21 calculates a prediction value of the time series data with respect to input of the time series data using the prediction model stored in the model storing unit 11 and supplies the prediction value to the target determining unit 22, the error calculating unit 23, the actuator of the agent, and the model updating unit 12.

Therefore, when a prediction value of the time series data is calculated by the time-series-data predicting unit 21 with respect to input of the error reduction data from the time-series-data retrieving unit 24, a prediction value of the time series data predicted by using the error reduction data is supplied to the target determining unit 22, the error calculating unit 23, the actuator of the agent, and the model updating unit 12.

Figure 2:
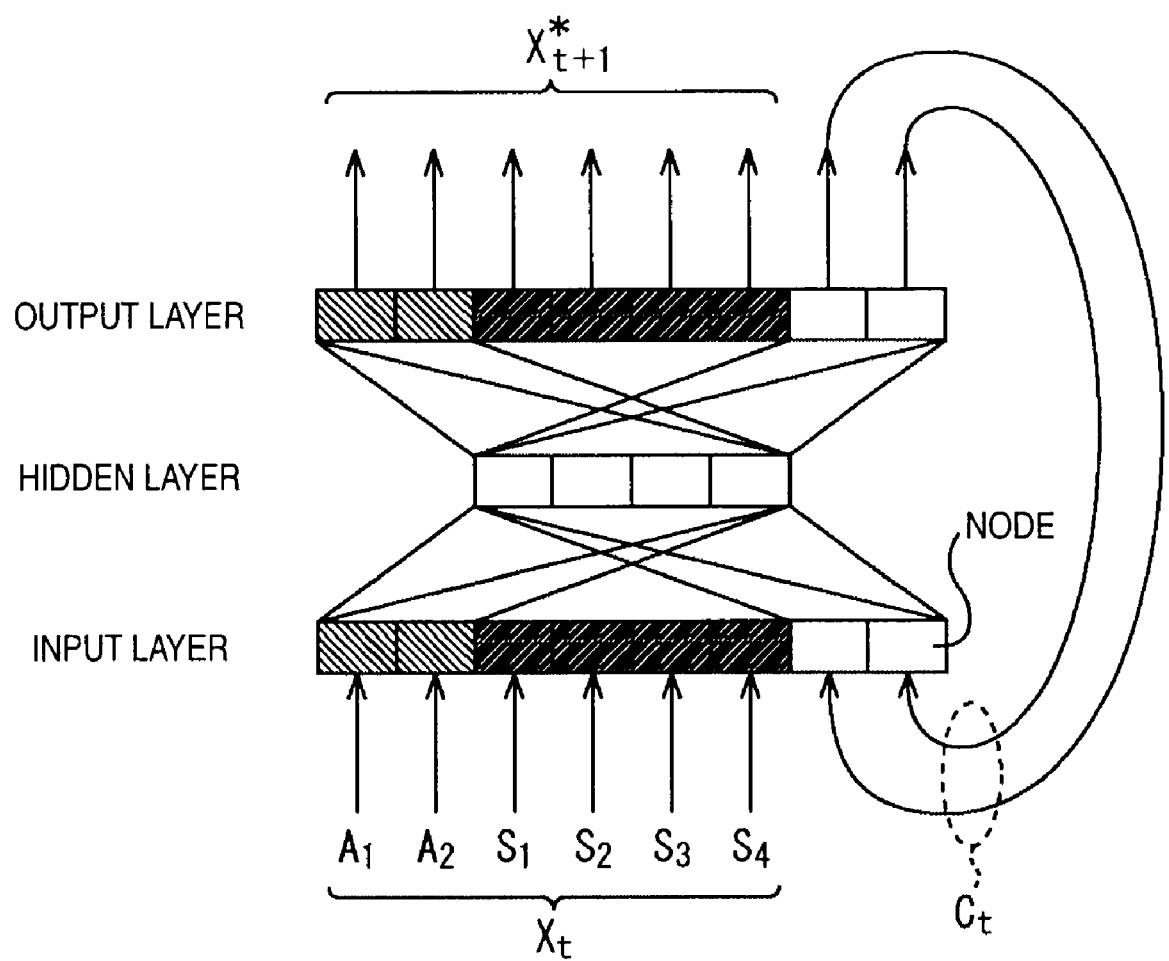
FIG. 2 is a diagram of an example of an RNN as a prediction model.

FIG. 2 is a diagram of an example of an RNN as a prediction model stored in the model storing unit 11 shown in FIG. 1.

In FIG. 2, the RNN includes three layers of an input layer a hidden layer (an intermediate layer), and an output layer. Each of the input layer, the hidden layer, and the output layer includes an arbitrary number of nodes equivalent to neurons.

The RNN outputs time series data from the output layer in response to input of time series data to the input layer. In the following explanation, the time series data as the input from the outside to the input layer of the RNN is also referred to as input data and the time series data output from the output layer of the RNN to the outside is also referred to as output data. The output data output by the RNN in response to the input data is also referred to as output data with respect to input data.

In the RNN, (a sample at time t of) time series data $X_t$ as input data is input (supplied) to input nodes as a part of the nodes of the input layer. In FIG. 2, as the time series data $X_t$, a vector including two-dimensional action data $A_1$ and $A_2$ and four-dimensional sensor data $S_1$, $S_2$, $S_3$, and $S_4$ as components is adopted.

The nodes other than the input nodes to which the input data $X_t$ is input are context nodes. Output of a part of the nodes of the output layer is fed back to the context nodes as a context representing an internal state.

A context at time t input to the context nodes of the input layer when the input data $X_t$ at time t is input to the input nodes of the input layer is represented as $C_t$.

The nodes of the hidden layer perform a weighted addition, which employs predetermined weight, targeting the input data $X_t$ input to the input layer and the context $C_t$, perform calculation of a nonlinear function that takes as an argument a result of the weighted addition, and output a result of the calculation to the nodes of the output layer.

A context $C_{t+1}$ at the next time t+1 is output from a part of the nodes of the output layer and fed back to the input layer. For example, a prediction value $X^*_{t+1}$ of the input data $X_{t+1}$ at the next time t+1 of the input data $X_t$ is output from the remaining nodes of the output layer as output data with respect to the input data $X_t$.

When the time series data $X_t$ as the input data is, for example, as explained above, the vector $(A_1,A_2,S_1,S_2,S_3,S_4)$ including the two-dimensional action data $A_1$ and $A_2$ and the four-dimensional sensor data $S_1$, $S_2$, $S_3$, and $S_4$ as the components, a vector as a prediction value $X^*_t$ of the time series data $X_t$ is represented as a vector $(A^*_1,A^*_2,S^*_1,S^*_2,S^*_3,S^*_4)$.

As explained above, in the RNN, the inputs to the nodes are subjected to the weighted addition. The weight used in the weighted addition is a parameter of a model of the RNN.

In FIG. 2, as the weight as the model parameter of the RNN, there are plural weights such as weight from the input nodes to the nodes of the hidden layer and weight from the nodes of the hidden layer to the nodes of the output layer. A matrix including the plural weights as components is referred to as weight matrix.

The model updating unit 12 (FIG. 1) performs learning of the RNN shown in FIG. 2 using, as learning data, time series data supplied thereto according to, for example, a BPTT (Back-Propagation Through Time) method.

A method of determining a target value by the target determining unit 22 shown in FIG. 1 is explained with reference to FIG. 3.

As explained above, the target determining unit 22 calculates, on the basis of the prediction value of the sensor data included in the prediction value of the time series data from the time-series-data predicting unit 21, for example, a predetermined function that takes as an argument the prediction value of the sensor data, and determines a function value as a result of the calculation as a target value of the sensor data included in the time series data.

Figure 3:
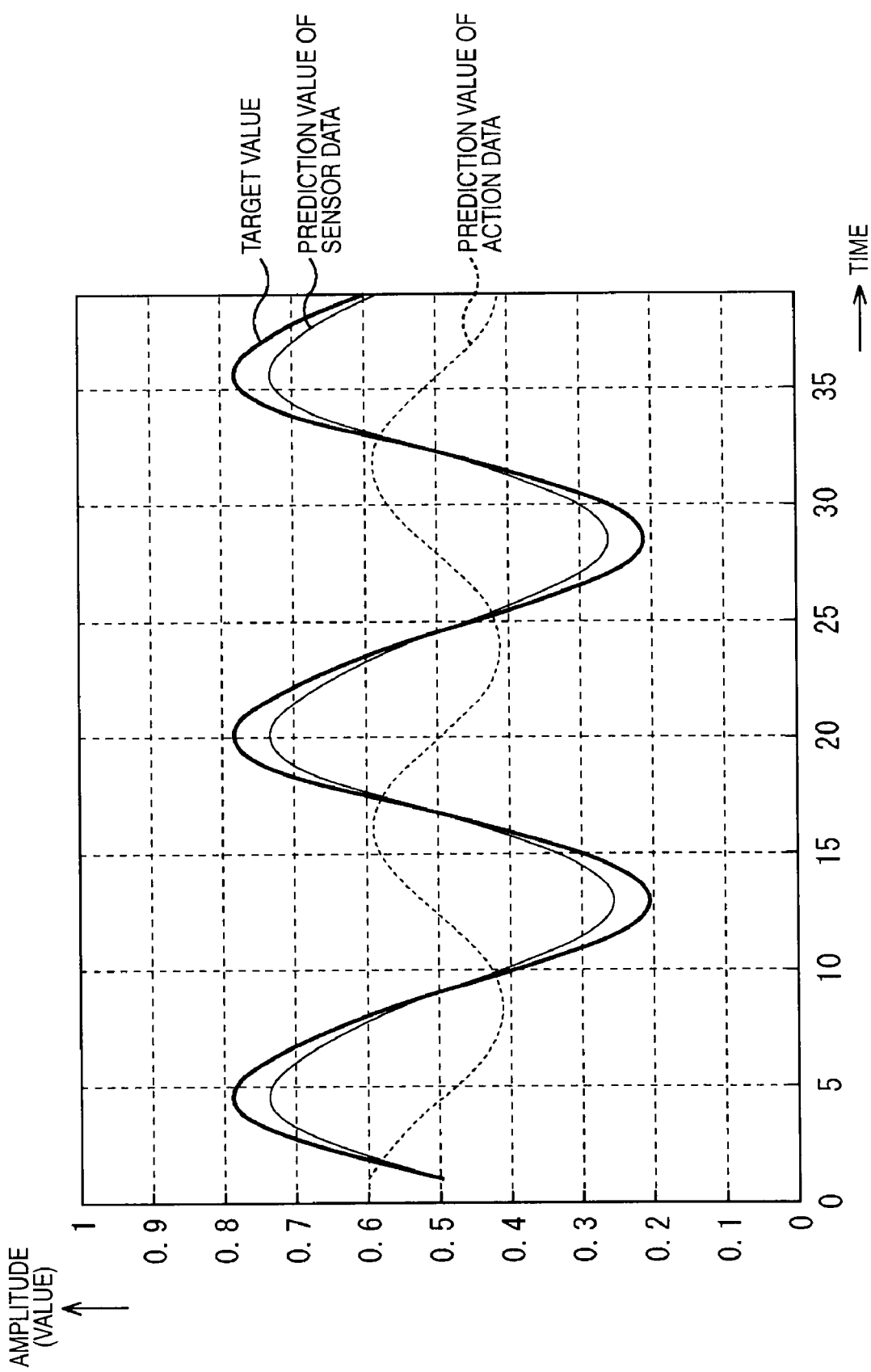
FIG. 3 is a graph of temporal changes in prediction values of sensor data and action data and a target value of the sensor data determined on the basis of the prediction value of the sensor data.

FIG. 3 is a graph of temporal changes in prediction values of the sensor data and the action data included in the prediction value of the time series data and a target value (of the sensor data) determined on the basis of the prediction value of the sensor data.

In FIG. 3, the abscissa represents time and the ordinate represents amplitude.

For example, it is assumed that, as explained in FIG. 2, the vector $(A_1,A_2,S_1,S_2,S_3,S_4)$ is adopted as the time series data $X_t$. Then, the prediction value and the target value of the sensor data shown in FIG. 3 are a prediction value and a target value of certain one-dimensional sensor data among the four-dimensional sensor data $S_1$, $S_2$, $S_3$, and $S_4$ in the time series data $X_t=(A_1,A_2,S_1,S_2,S_3,S_4)$.

Similarly, the prediction value of the action data shown in FIG. 3 is a prediction value of certain one-dimensional action data of the two-dimensional action data $A_1$ and $A_2$ in the time series data $X_t=(A_1,A_2,S_1,S_2,S_3,S_4)$.

In FIG. 3, a value obtained by multiplying the prediction value of the sensor data by 1.2 using a function for multiplying the prediction value of the sensor data by 1.2 is determined as the target value of the sensor data.

As a function used for determination of a target value in the target determining unit 22 (hereinafter also referred to as function for target determination), besides adopting a function for increasing the size (an absolute value) of a prediction value such as multiplying the prediction value by 1.2 as explained above, it is possible to adopt a function for reducing the size of the prediction value (e.g., a function for multiplying the prediction value by 0.8).

As the function for target determination, besides a function in which a multiplier multiplied with the prediction value is fixed, it is possible to adopt a function in which a multiplier is variable. When the function in which the multiplier is variable is adopted, plural multipliers are prepared. The plural multipliers can be selected in order as a multiplier used for the multiplication with the prediction value. Alternatively, the multiplier used for the multiplication with the prediction value can be determined by, for example, a random number.

In FIG. 3, the target value is determined for the one-dimensional sensor data among the four-dimensional sensor data $S_1$, $S_2$, $S_3$, and $S_4$ in the time series data $X_t=(A_1,A_2,S_1,S_2,S_3,S_4)$. However, the target value can be determined for sensor data in a dimension equal to or larger than two dimensions.

Further, the target value can be determined for the action data and can be determined for both the sensor data and the action data.

The method of determining the target value is not limited to the method employing a function.

It is desirable that the target value is a value in a range in which, virtually, the RNN is generalizable from a prediction value that the RNN as the prediction model can predict.

Therefore, for example, a target value is determined for D-dimensional sensor data. For example, it is possible to determine, as a target value, a value (a vector) represented by an arbitrary point in a range of a distance proportional to the size of a vector as the D-dimensional sensor data from a point indicated by the vector (e.g., a distance sufficiently shorter than the size of the vector) in a space of the D-dimensional sensor data.

The retrieval of error reduction data by the generating device 20 shown in FIG. 1 is explained with reference to FIG. 4.

Figure 4:
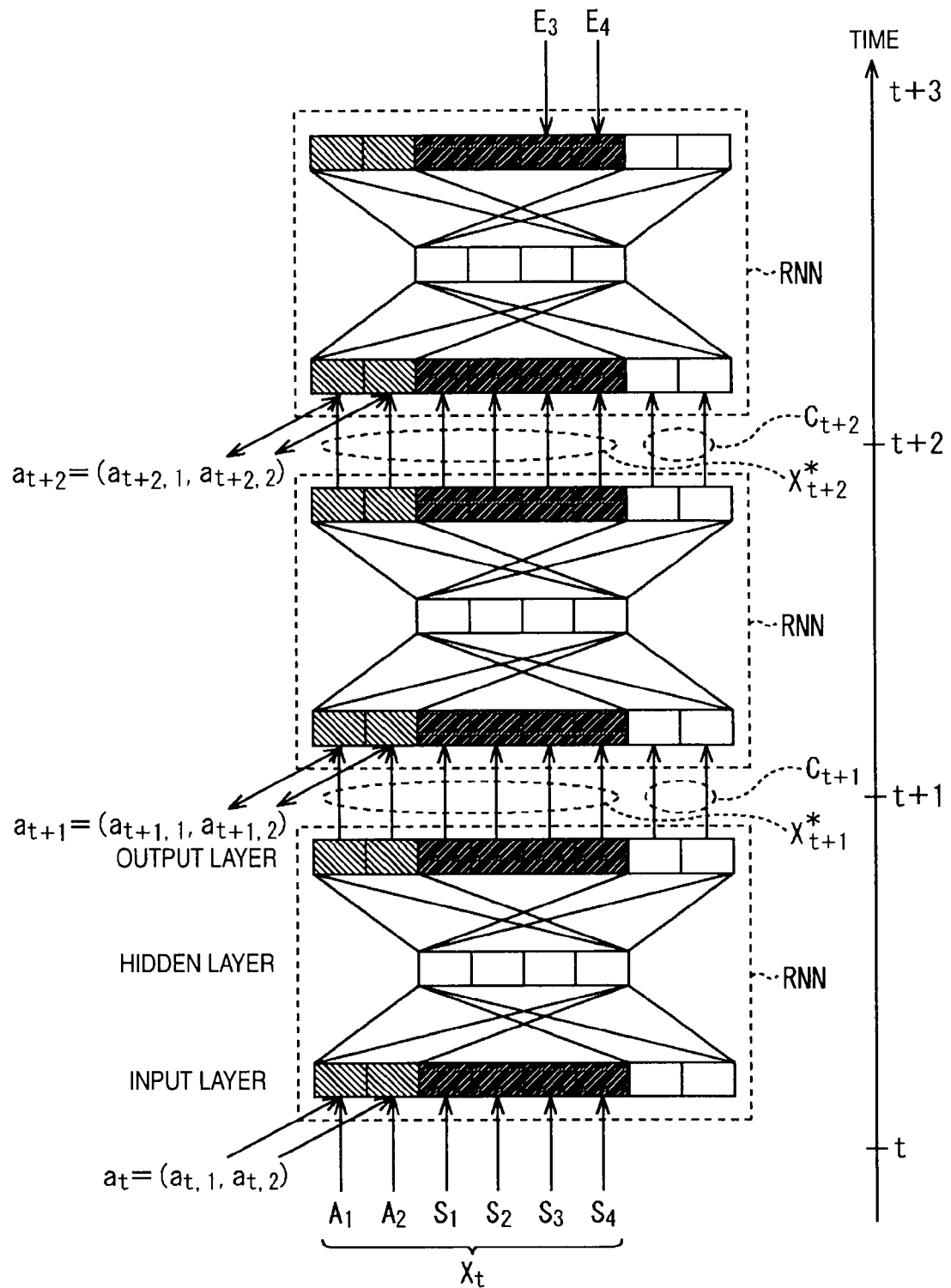
FIG. 4 is a diagram for explaining the retrieval of action data as error reduction data.

FIG. 4 is a diagram of input and output of the RNN as the prediction model performed when time series data from the time series data $X_t$ at time t to time series data $X_{t+3}$ at time t+3 three times later are predicted by using the RNN.

In FIG. 4, the ordinate represents time. In FIG. 4, the RNN is illustrated along the time (for each of times).

It is assumed that the time series data $X_t=(A_1,A_2,S_1,S_2,S_3,S_4)$ at time t is supplied to the time-series-data predicting unit 21 of the generating device 20.

The time series data $X_t=(A_1,A_2,S_1,S_2,S_3,S_4)$ at time t supplied to the time-series-data predicting unit 21 includes the sensor data $(S_1,S_2,S_3,S_4)$ at time t from the sensor of the agent and the action data $(A_1,A_2)$ at time t for driving the actuator and the like of the agent.

The action data $(A_1,A_2)$ at time t included in the time series data $X_t$ at time t is equal to a prediction value of the action data included in the prediction value $X^*_t$ of the time series data at time t predicted with respect to input of time series data at time before time t (e.g., time t−1) in the time-series-data predicting unit 21.

The time-series-data predicting unit 21 sequentially calculates, using the RNN stored in the model storing unit 11, prediction values $X^*_{t+1}$ to $X^*_{t+N}$ of time series data $X_{t+1}$ to $X_{t+N}$ at respective times up to time t+N N times later with respect to the input of the time series data $X_t$ at time t.

N is a value equal to or larger than 2 and is hereinafter referred to as search length.

In FIG. 4, with the search length N set to 3, prediction values $X^*_{t+1}$ to $X^*_{t+3}$ at time t+1 to time t+3 are calculated.

The time-series-data predicting unit 21 calculates, using the RNN, a prediction value $X^*_{t+1}$ of the time series data and a context $C_{t+1}$ at time t+1 with the time series data $X_t$ at time t set as input data.

As the context $C_t$ at time t in calculating the prediction value $X^*_{t+1}$ of the time series data at time $_{t+}1$, for example, a random value or the like can be adopted.

Thereafter, the time-series-data predicting unit 21 calculates a prediction value $X^*_{t+2}$ of the time series data and a context $C_{t+2}$ at time t+2 by inputting the prediction value $X^*_{t+1}$ of the time series data and the context $C_{t+1}$ at time t+1 to the RNN.

Further, the time-series-data predicting unit 21 calculates a prediction value $X^*_{t+3}$ of time series data and a context $C_{t+3}$ at time t+3 by inputting the prediction value $X^*_{t+2}$ of the time series data and the context $C_{t+2}$ at time t+2 to the RNN.

When the time-series-data predicting unit 21 calculates a prediction value $X_{t+N}$ of time series data at time t+N the search length N later, the time-series-data predicting unit 21 supplies the prediction value $X_{t+N}$ of the time series data at time t+N to the target determining unit 22 and the error calculating unit 23.

In FIG. 4, since the search length N is 3, the time-series-data predicting unit 21 supplies the prediction value $X^*_{t+3}$ of the time series data at time t+3 to the target determining unit 22 and the error calculating unit 23.

The target determining unit 22 determines a target value $S_T=(S_{T3},S_{T4})$ for, for example, two-dimensional sensor data $(S_3,S_4)$ among the time series data $X_t=(A_1,A_2,S_1,S_2,S_3,S_4)$ and supplies the target value $S_T=(S_{T3},S_{T4})$ to the error calculating unit 23.

The error calculating unit 23 calculates, according to Formula (1), an error E of a prediction value $S^*_{t+3}=(S^*_3,S^*_4)$ of the two-dimensional sensor data $S_3$ and $S_4$ included in the prediction value $X^*_{t+3}$ from the time-series-data predicting unit 21 with respect to the target value $S_T$ from the target determining unit 22 and supplies the error E to the time-series-data retrieving unit 24.

$$E = \frac{1}{2}(S_T - S^*_{t+N})^2$$

Formula (1) is calculated for each of the sensor data $S_3$ and $S_4$. Consequently, an error $E_3$ of the prediction value $S^*_3$ and an error $E_4$ of the prediction value $S^*_4$ are calculated.

The time-series-data retrieving unit 24 retrieves error reduction data as input data to the RNN for reducing the error E of the prediction value $S^*_{t+3}$ of the sensor data from the error calculating unit 23 and supplies the error reduction data to the time-series-data predicting unit 21.

The time-series-data retrieving unit 24 uses, in the retrieval of the error reduction data, for example, the BPTT method used by the model updating unit 12 for learning of the RNN.

However, whereas the weight of the RNN is adjusted (updated) to reduce the error E of the prediction value in the learning of the RNN, input data is adjusted to reduce the error E of the prediction value in the retrieval of the error reduction data.

The time-series-data retrieving unit 24 calculates, using the error E from the error calculating unit 23 and according to Formula (2), an adjustment component $\Delta A_{t+n}$ for adjusting the action data $A=(A_1,A_2)$ as input data to the RNN (n=0, 1, ..., and N−1).

$$\Delta A_{t+n} = \varepsilon\left[-\frac{\delta E}{\delta A_{t+n}} + k(A^*_{t+n} - A_{t+n})\right] + N_G$$

$\Delta A_{t+n}$ represents an adjustment component for adjusting the action data $A=(A_1,A_2)$ used as the input data in calculating the error E of Formula (1).

$\varepsilon$ represents a learning coefficient and k represents an inertia coefficient. $\delta E/\delta_{t+n}$ represents a differential value obtained by partially differentiating the error E with the action data $A_{t+n}$ as a variable.

$N_G$ represents white noise (Gaussian Noise) for preventing the adjustment component from falling into local minimum.

$A_{t+n}$ of $A^*_{t+n}$−$A_{t-n}$ represents action data at time t+n as error reduction data at the present point. $A^*_{t+n}$ represents a prediction value of the action data $A_{t+n}$ obtained by so-called forward calculation (prediction).

The time-series-data retrieving unit 24 calculates, according to formula (2), an adjustment component $\Delta A_{t+n}$=($\Delta A_{t+n,1}$,$\Delta A_{t+n,2}$) for adjusting action data $A_{t+n}$=($A_{t+n,1}$, $A_{t+n,2}$) at time t+n as error reduction data at the present point. Then, the time-series-data retrieving unit 24 calculates action data $a_{t+n}$=($a_{t+n,1}$,$a_{t+n,2}$) for reducing the error E by adjusting the error reduction data $A_{t+n}$=($A_{t+n,1}$,$A_{t+n,2}$) at the present point with the adjustment component $\Delta A_{t+n}$=($\Delta A_{t+n,1}$, $\Delta A_{t+n,2}$).

The action data $a_{t+n}$ is action data $A_{t+n}$ at time t+n as error reduction data at the present point when the adjustment component $\Delta A_{t+n}$ is calculated next.

The time-series-data retrieving unit 24 repeats the adjustment of the error reduction data $A_{t+n}$, for example, a predetermined number of times, or until the error E is reduced to be equal to or smaller than a predetermined threshold and supplies finally-obtained error reduction data $a_{t+n}$=($a_{t+n,1}$,$a_{t+n,2}$) to the time-series-data predicting unit 21.

In FIG. 4, the search length N is 3 and (time series of) action data at, $a_{t+1}$, and $a_{t+2}$ at times t, t+1, and t+2(=t+N−1) are supplied from the time-series-data retrieving unit 24 to the time-series-data predicting unit 21 as error reduction data.

For example, in Tani, et al., "Model-Based Learning for Mobile Robot Navigation from the Dynamical Systems Perspective," IEEE Trans. System, Man and Cybernetics Part B, 26(3), 421 to 436, 1996 (hereinafter referred to as Document A), a method of causing an RNN to learn actions of a navigation robot in advance offline and, when a certain goal is given, searching for a sequence of an action for attaining the goal is described.

The method of Document A is used for the retrieval of error reduction data by the time-series-data retrieving unit 24. In Document A, actions of the navigation robot are treated as two values of 0 and 1. However, in the retrieval of error reduction data by the time-series-data retrieving unit 24, the method of the document A is expanded to treat action data (error reduction data) of continuous values.

When the error reduction data is supplied from the time-series-data retrieving unit 24, the time-series-data predicting unit 21 sequentially calculates, using the RNN stored in the model storing unit 11, the prediction values $X^*_{t+1}$ to $X^*_{t+N}$ of time series data $X_{t+1}$ to $X_{t+N}$ at respective times up to time t+N N times later with respect to the input of the time series data $X_t$ at time t again.

However, when the error reduction data is supplied from the time-series-data retrieving unit 24, the time-series-data predicting unit 21 calculates the prediction values $X^*_{t+1}$ to $X^*_{t+3}$ of the time series data $X_{t+1}$ to $X_{t+3}$ using the error reduction data from the time-series-data retrieving unit 24.

The time-series-data predicting unit 21 replaces the action data $A=(A_1,A_2)$ of the time series data with the error reduction data $a_{t+n}$=($a_{t+n,1}$,$a_{t+n,2}$) and calculates the prediction values $X^*_{t+1}$ to $X^*_{t+N}$ using the time series data after the replacement as input data.

The time-series-data predicting unit 21 replaces the action data of the time series data $X_t$ at time t with the error reduction data $a_t$ at time t and calculates the prediction value $X^*_{t+1}$ of the time series data at time t+1 using the time series data after the replacement as input data.

Further, the time-series-data predicting unit 21 replaces the action data of the prediction value $X^*_{t+1}$ of the time series data at time t+1 calculated in the immediately preceding calculation with the error reduction data $a_{t+1}$ at time t+1 and calculates the prediction value $X^*_{t+2}$ of the time series data at time t+2 using the time series data after the replacement as input data.

The time-series-data predicting unit 21 replaces the action data of the prediction value $X^*_{t+2}$ of the time series data at time t+2 calculated in the immediately preceding calculation with the error reduction data $a_{t+2}$ at time t+2 and calculates the prediction value $X^*_{t+3}$ of the time series data at time t+3 using the time series data after the replacement as input data.

When the time series data $X_t$ at time t is supplied to the time-series-data predicting unit 21, the agent has already performed an action at time t conforming to the action data included in the time series data $X_t$. Therefore, it is difficult to cause the agent to take an action conforming to the error reduction data $a_t$ at time t.

Therefore, the time-series-data predicting unit 21 can calculates the prediction value $X^*_{t+1}$ of the time series data at time t+1 directly using the time series data $X_t$ at time t (the action data included in the time series data $X_t$ at time t) without replacing the time series data $X_t$ with the error reduction data $a_t$ at time t. This processing can be performed by, in the time-series-data retrieving unit 24, adopting the action data included in the time series data $X_t$ at time t as the error reduction data $a_t$ at time t and, in time-series-data predicting unit 21, replacing the action data in the time series data $X_t$ at time t with the error reduction data $a_t$ at time t and calculating the prediction value $X^*_{t+1}$ of the time series data at time t+1 using the time series data after the replacement as input data.

As the error reduction data $a_t$ at time t, besides adopting the action data included in the time series data $X_t$ at time t, for example, it is also possible to adopt a random number.

When the time-series-data predicting unit 21 calculates the prediction value $X^*_{t+3}$ of the time series data at time t+3 as time t+N the search length N later, the time-series-data predicting unit 21 supplies the prediction value $X^*_{t+3}$ of the time series data at time t+3 to the error calculating unit 23.

The error calculating unit 23 calculates an error E of the prediction value $S^*_{t+3}$ of the sensor data included in the prediction value $X^*_{t+3}$ from the time-series-data predicting unit 21 according to Formula (1) and supplies the error E to the time-series-data retrieving unit 24.

Thereafter, in the generating device 20, the retrieval of error reduction data by the time-series-data retrieving unit 24, the calculation (prediction) of a prediction value performed by the time-series-data predicting unit 21 using the error reduction data, and the calculation of an error of the prediction value by the error calculating unit 23 are repeated until the error E is reduced to be a sufficiently small value such as a value equal to or smaller than a predetermined threshold.

When the error E is reduced to a sufficiently small value, the time-series-data predicting unit 21 supplies the error reduction data at the time when the error E is sufficiently small to the actuator of the agent and the model updating unit 12 of the learning device 10.

Therefore, the agent acts according to the action data as the error reduction data for reducing the error E relative to a target value to be sufficiently small. In other words, the agent takes an action in which sensor data reaches a target value.

In the case explained above, the target determining unit 22 determines a target value of the time series data $X_{t+N}$ at time t the search length N later from the time series data $X_t$ at time t supplied to the time-series-data predicting unit 21. The time-series-data retrieving unit 24 calculates the action data (error reduction data) $a_t, a_{t+1}, \ldots,$ and $a_{t+N-1}$ at times t, t+1, . . . , and t+N−1 for reducing the error E of a prediction value relative to the target value. However, the target determining unit 22 can also determine a target value at each of times t+1, t+2, . . . , and t+N. The time-series-data retrieving unit 24 can calculate, for each of times t'+1 (t'=t, t+1, . . . , t+N−1), action data $a_t'$ at time t one time earlier for reducing an error of a prediction value relative to a target value at time t'+1.

That is, the action data $a_t, a_{t+1}, \ldots,$ and $a_{t+N-1}$ at times t, t+1, . . . , and t+N−1 as the error reduction data can be calculated by determining target values at one or more arbitrary times among times t, t+1, . . . , and t+N−1 and reducing each of errors of prediction values relative to the target values at the one or more times, as well as by determining a target value at time t+N and reducing an error of a prediction value relative to the target value.

Figure 5:
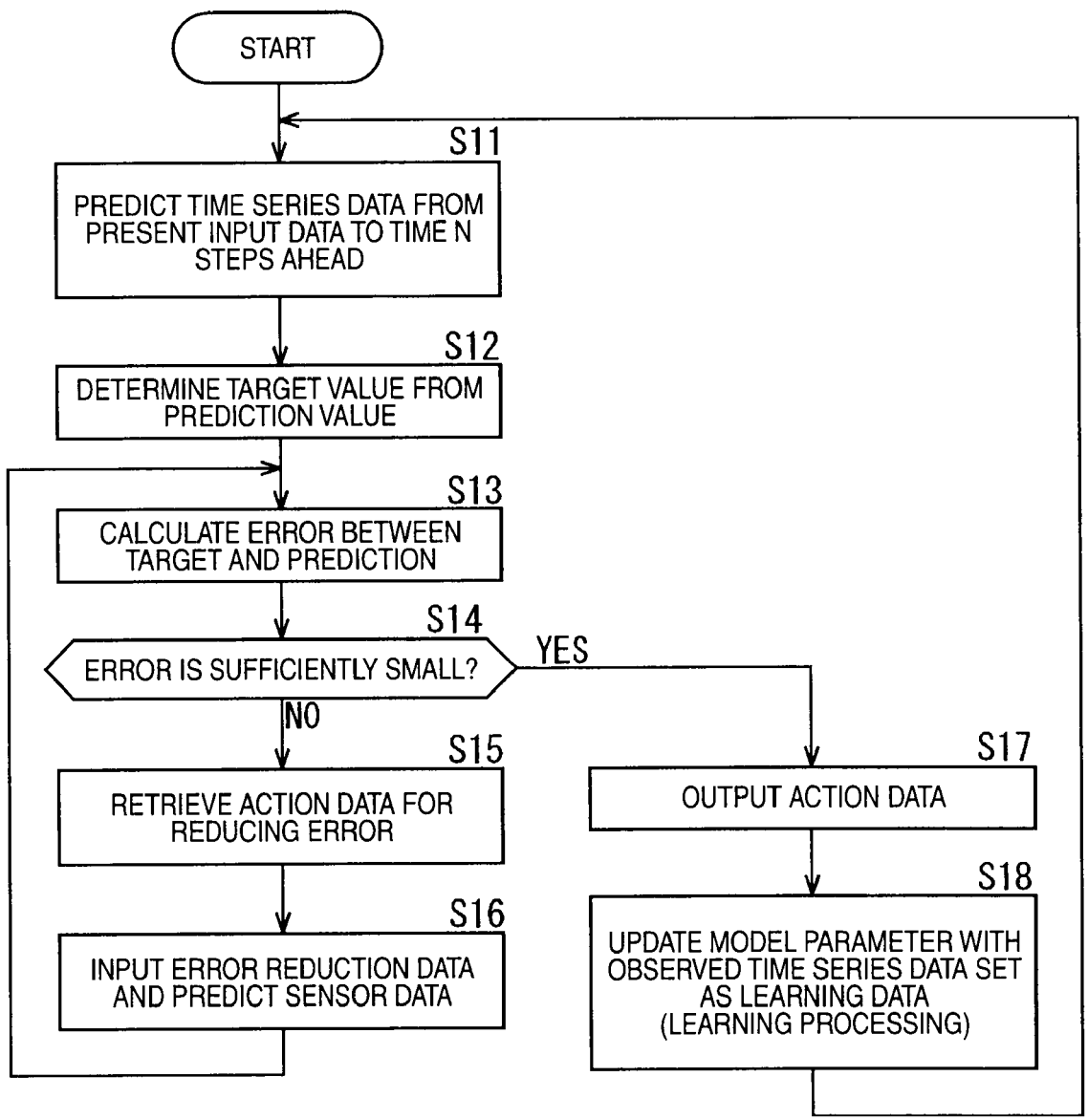
FIG. 5 is a flowchart for explaining processing by the data processing apparatus.

FIG. 5 is a flowchart for explaining processing (data processing) performed by the data processing apparatus shown in FIG. 1.

It is assumed that, at time t, the time-series-data predicting unit 21 outputs a prediction value of time series data at time t and (a prediction value of) action data at time t included in the prediction value of the time series data at time t is supplied to the actuator of the agent.

In this case, the actuator of the agent drives the agent according to the action data at time t. Consequently, the agent takes a predetermined action. The sensor of the agent senses an environment after the action of the agent and outputs sensor data at time t.

A vector including the action data at time t output by the time-series-data predicting unit 21 and the sensor data at time t output by the sensor of the agent as components is supplied to the time-series-data predicting unit 21 as time series data at time t.

In step S11, the time-series-data predicting unit 21 sequentially calculates, using the RNN stored in the model storing unit 11 and with the time series data at time t supplied to the time-series-data predicting unit 21 set as input data, prediction values of time series data from time t+1 to time t+N the search length N later.

When the time-series-data predicting unit 21 calculates the prediction values of the time series data at times t+1 to t+N, the time-series-data predicting unit 21 supplies the prediction value of the time series data at time t+N among the prediction values to the target determining unit 22 and the error calculating unit 23. Processing proceeds from step S11 to step S12.

In step S12, the target determining unit 22 determines, on the basis of the prediction value of the time series data at time t+N from the time-series-data predicting unit 21, a target value of sensor data (included in the time series data) at time t+N and supplies the target value to the error calculating unit 23. The processing proceeds to step S13.

In step S13, the error calculating unit 23 calculates, for example, according to Formula (1), an error of a prediction value of the sensor data included in the prediction value of the time series data at time t+N from the time-series-data predicting unit 21 relative to the target value of the sensor data from the target determining unit 22 (hereinafter also referred to as sensor prediction error). The processing proceeds to step S14.

In step S14, the error calculating unit 23 determines whether the sensor prediction error is sufficiently small.

When it is determined in step S14 that the sensor prediction error is not sufficiently small, the error calculating unit 23 supplies the sensor prediction error to the time-series-data retrieving unit 24. The processing proceeds to step S15.

In step S15, the time-series-data retrieving unit 24 retrieves action data included in input data at times t to t+N−1 to the RNN for reducing the sensor prediction error E from the error calculating unit 23 and supplies the action data to the time-series-data predicting unit 21 as error reduction data.

Thereafter, the processing proceeds from step S15 to step S16. The time-series-data predicting unit 21 sequentially calculates prediction values of the time series data at times t+1 to t+N using the RNN stored in the model storing unit 11 and using the error reduction data at times t to t+N−1 from the time-series-data retrieving unit 24 as (apart of) the input data.

At time t' (=t, t+1, . . . , and t+N−1) from times t to t+N−1, the time-series-data predicting unit 21 replaces action data included in a prediction value of time series data at time t' calculated by the RNN with action data at time t' from the time-series-data retrieving unit 24 and calculates, with the RNN, a prediction value of time series data at time t'+1 one time later using the time series data after the replacement as input data. When time t' is equal to t, the time series data at time t used in the immediately preceding step S11 is used as input data.

The time-series-data predicting unit 21 replaces the action data included in the prediction value of the time series data at time t+N−1 with the action data at time t+N−1 from the time-series-data retrieving unit 24. The time-series-data predicting unit 21 calculates a prediction value of time series data at time t+N one time later using the time series data after the replacement as input data and supplies the prediction value of the time series data at time t+N to the error calculating unit 23. The processing returns from step S16 to step S13.

In step S13, the error calculating unit 23 calculates an error of the prediction value of the sensor data included in the prediction value of the time series data at time t+N from the time-series-data predicting unit 21 relative to the target value of the sensor data from the target determining unit 22 (a sensor prediction error). The processing proceeds from step S13 to step S14. Thereafter, the same processing is repeated.

On the other hand, when it is determined in step S14 that the sensor prediction error is sufficiently small, i.e., when, at times t to t+N−1, the sensor data at time t+N output by the sensor of the agent is a value close to (or coinciding with) the target value in step S12 because the agent acts according to the action data as the error reduction data at times t to t+N-1 from the time-series-data retrieving unit 24, the processing proceeds to step S17. The time-series-data predicting unit 21 supplies action data as error reduction data at times t+1 to t+N−1 when it is determined that the sensor prediction error is sufficiently small to the actuator of the agent.

When, before the error reduction data is calculated in step S15, it is determined in step S14 that the sensor prediction error is sufficiently small, in step S17, the time-series-data predicting unit 21 supplies (the prediction value of) the action data included in the prediction values of the time series data at times t+1 to t+N−1 calculated in step S11 to the actuator of the agent as error reduction data.

The actuator of the agent drives the agent according to the error reduction data at times t+1 to t+N−1 from the time-series-data predicting unit 21. Consequently, at times t+1 to t+N−1, the agent acts according to error reduction data (action data) for reducing the sensor prediction error to be sufficiently small. In other words, the agent takes an action in which sensor data reaches a target value.

On the other hand, the sensor of the agent senses environments at times t+1 to t+N−1 during an action of the agent and outputs sensor data.

In this case, a vector including the action data at times t+1 to t+N−1 output by the time-series-data predicting unit 21 and the sensor data at times t+1 to t+N−1 output by the sensor of the agent as components is supplied as time series data at time t+1 to t+N−1.

Thereafter, the processing proceeds from step S17 to step S18. The model updating unit 12 performs learning processing for updating the model parameter of the RNN stored in the model storing unit 11 using, as learning data, the time series data at times t+1 to t+N−1 supplied thereto.

The processing returns from step S18 to step S11. Thereafter, the same processing is repeated.

When the time series data at times t+1 to t+N−1 are supplied to the model updating unit 12, the time series data at last (latest) time t+N−1 among the time series data is supplied to the time-series-data predicting unit 21.

In step S11, the time-series-data predicting unit 21 sequentially calculates prediction value of time series data up to time the search length N later using the RNN stored in the model storing unit 11 and with the time series data at time t+N−1 supplied thereto set as input data. The time-series-data predicting unit 21 supplies the prediction value of the time series data at the latest time among the prediction values to the target determining unit 22 and the error calculating unit 23. The processing proceeds from step S11 to step S12.

In step S12, the target determining unit 22 determines, on the basis of the prediction value of the time series data at the latest time from the time-series-data predicting unit 21, a target value of sensor data (included in the time series data) at the latest time. In this case, the target determining unit 22 determines, virtually, a target higher than that in step S12 in the last time.

Concerning the RNN stored in the model storing unit 11, learning for allowing the agent to attain the target (value) determined in step S12 in the last time is already performed in step S18 in the last time. In step S12 in this time, a target (value) is determined on the basis of a prediction value predicted by using such an RNN. Therefore, a target higher than that in step S12 in the last time is determined.

When the target determining unit 22 determines a target value, the target determining unit 22 supplies the target value to the error calculating unit 23. The processing proceeds from step S12 to step S13. Thereafter, the same processing is repeated.

As explained above, in the generating device 20, the time-series-data predicting unit 21 calculates a prediction value of time series data with respect to input of the time series data using the RNN as the prediction model for predicting time series data. Further, the target determining unit 22 determines a target value of the time series data on the basis of the prediction value of the time series data. The error calculating unit 23 calculates an error of the prediction value relative to the target value. The time-series-data retrieving unit 24 retrieves error reduction data as input of the time series data to the RNN for reducing the error of the prediction value.

Therefore, the agent can set a target in a generalizable range and quickly take an action for attaining the target.

The target value of the time series data is determined on the basis of the prediction value of the time series data calculated by using the RNN. Therefore, it is possible to set a target in a range in which generalization by the RNN is possible even if a specific target (a target value) is not given from the outside.

Further, the error reduction data as the time series data for reducing the error of the prediction value relative to the target value is retrieved, i.e., the time series data (the error reduction data) is retrieved with an orientation of reducing the error. Therefore, since the agent acts according to the error reduction data, the agent can quickly take an action for attaining a target.

In FIG. 5, in step S17, the time-series-data predicting unit 21 supplies the error reduction data at times t+1 to t+N−1 to the actuator of the agent. However, the error reduction data at a part of times from time t+1 among the error difference data at times t+1 to t+N−1 can be supplied to the actuator of the agent.

When, in step S17, the time-series-data predicting unit 21 supplies the error reduction data for N' times from time t+1 to time t+N' (<N−1) among the error reduction data for N−1 times from time t+1 to time t+N−1 to the actuator of the agent, in the next step S11, the time-series-data predicting unit 21 calculates a prediction value of time series data with the time series data at the latest time t+N' set as input data.

In FIG. 5, in step S17, every time the time-series-data predicting unit 21 supplies the error reduction data to the actuator of the agent, in step S18, the model updating unit 12 performs the learning processing for the RNN stored in the model storing unit 11. However, it is not always necessary to perform the learning processing for the RNN every time the time-series-data predicting unit 21 supplies the error reduction data to the actuator of the agent.

The learning processing for the RNN can be performed by using, as learning data, time series data for N"×N times including, as action data, error reduction data for N"×N times that the time-series-data predicting unit 21 supplies to the actuator up to that point every time the time-series-data predicting unit 21 supplies error reduction data for N' times to the actuator of the agent plurality times, i.e., N" times.

Figure 6:
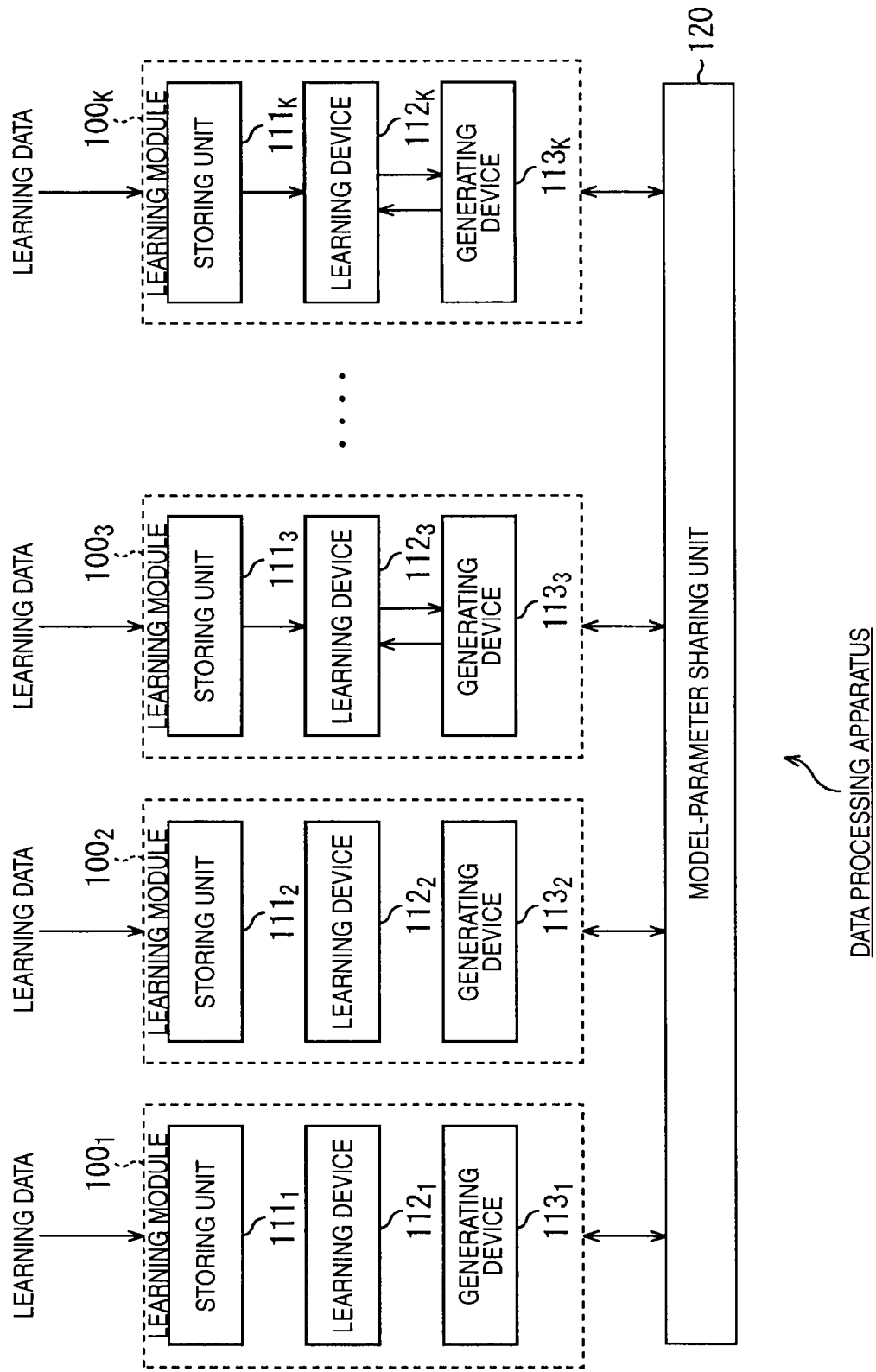
FIG. 6 is a block diagram of a configuration example of a data processing apparatus according to another embodiment of the present invention.

FIG. 6 is a block diagram of a configuration example of a data processing apparatus according to another embodiment of the present invention.

In FIG. 6, the data processing apparatus includes plural, i.e., K learning module $100_1$ to $100_K$ and a model-parameter-sharing unit 120. The data processing apparatus configures, as in the case of FIG. 1, a part of control blocks for controlling an agent.

The learning module $100_i$ (i=1, 2, . . . , and K) includes a storing unit $111_i$, a learning device $112_i$, and a generating device $113_i$. The learning module $100_i$ performs learning of a prediction model, i.e., update of a model parameter of the prediction model.

Time series data as learning data is supplied to the storing unit $111_i$. The storing unit $111_i$ stores the learning data supplied thereto.

The learning device $112_i$ is configured in the same manner as the learning device 10 shown in FIG. 1. Therefore, the learning device $112_i$ stores, for example, (weight as a model parameter of) an RNN as a prediction model. The learning device $112_i$ performs learning of the RNN as the prediction model, i.e., update of the model parameter of the RNN using the learning data stored in the storing unit $111_i$.

The generating device $113_i$ is configured in the same manner as the generating device 20 shown in FIG. 1. The generating device $113_i$ retrieves action data as error reduction data and outputs the action data.

The error reduction data output by the generating device $113_i$ is supplied to an actuator and the like of the agent.

The actuator of the agent drives the agent according to the error reduction data from the generating device $113_i$. Consequently, the agent acts according to the error reduction data.

A sensor of the agent senses an environment during an action of the agent and outputs sensor data.

In this case, a time series of a vector including the action data as the error reduction data output by the generating device $113_i$ and sensor data output by the sensor of the agent as components is supplied to the storing unit $111_j$ of the learning module $100_j$ (j≠i) as learning data.

The storing unit $111_j$ of the learning module $100_j$ stores the learning data supplied as explained above. The learning device $112_j$ performs learning of the RNN using the learning data.

The model-parameter sharing unit 120 performs sharing processing for causing the K learning modules $100_1$ to $100_K$ to share the model parameter of the prediction model. Since the model-parameter sharing unit 120 performs the sharing processing, the K learning modules $100_1$ to $100_K$ share the model parameter.

Processing by the data processing apparatus shown in FIG. 6 is explained.

In each of the learning modules $100_1$ to $100_K$ of the data processing apparatus shown in FIG. 6, processing same as that performed by the data processing apparatus shown in FIG. 1, i.e., processing explained with reference to the flowchart of FIG. 5 is performed.

However, in the data processing apparatus shown in FIG. 1, as explained above, the learning device 10 performs the learning processing for the RNN using, as learning data, the time series data obtained (observed) by the agent acting according to the action data as the error reduction data output by the generating device 20.

On the other hand, in the data processing apparatus shown in FIG. 6, time series data obtained when the agent acts according to error reduction data output by the generating device $113_i$ of the learning module $100_i$ is stored as learning data in, for example, a storing unit $111_i$ of a learning module $100_{i+1}$ as the other learning module $100_j$. A learning device $112_{i+1}$ of the learning module $100_{i+1}$ performs update of weight as a model parameter of an RNN stored in the learning device $112_{i+1}$ using the learning data stored in the storing unit $111_{i+1}$.

Further, in the data processing apparatus shown in FIG. 6, sharing of weight is performed for the RNN for which update (learning) of weight is performed by using the learning data.

Figure 7:
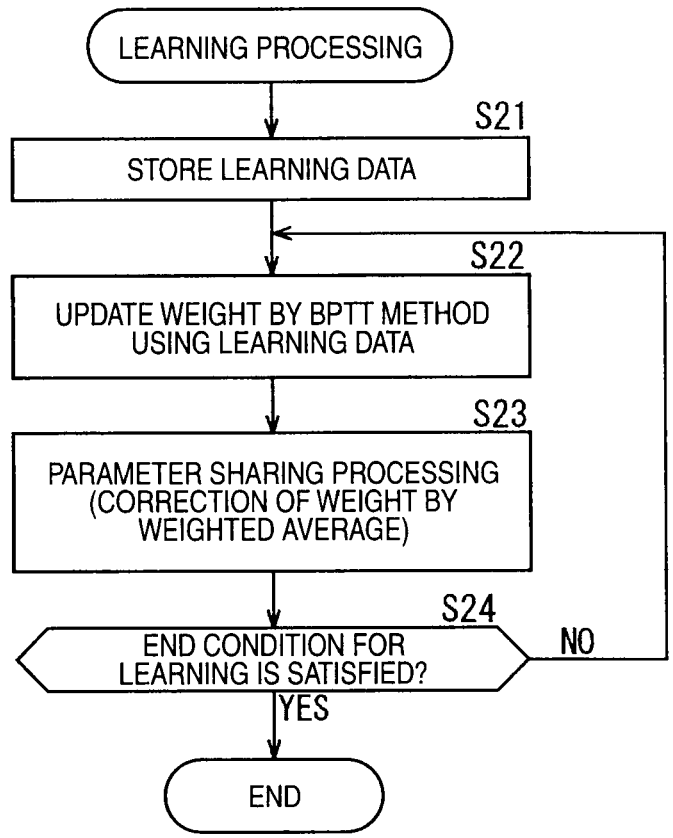
FIG. 7 is a flowchart for explaining learning processing by the data processing apparatus.

FIG. 7 is a flowchart for explaining the learning processing performed in step S18 in FIG. 5 in the data processing apparatus shown in FIG. 6.

For example, it is assumed that, in the learning module $100_1$, time series data obtained when the agent takes a certain basic action is stored in the storing unit $111_1$ as learning data. Further, it is assumed that learning of the RNN stored in the learning device $112_1$ is already performed by using the learning data stored in the storing unit $111_1$.

In the data processing apparatus shown in FIG. 6, the processing in steps S11 to S17 in FIG. 5 is performed in a learning module $100_L$ (1≦L≦K), latest learning data of which is stored in a storing unit $111_L$, among the K learning modules $100_1$ to $100_K$.

In step S17, error reduction data output by a generating device $113_L$ of the learning module $100_L$ is supplied to the actuator and the like of the agent.

The actuator of the agent drives the agent according to the error reduction data from the generating device $113_L$. Consequently, the agent acts according to the error reduction data.

The sensor of the agent senses an environment during an action of the agent and outputs sensor data.

A time series of a vector including action data as the error reduction data output by the generating device $113_L$ and sensor data output by the sensor of the agent as components is supplied to, for example, a learning module $100_{L+1}$ as learning data.

When the learning data is supplied to the learning module $100_{L+1}$, in the data processing apparatus shown in FIG. 6, the learning processing explained with reference to FIG. 7 is performed in step S18 in FIG. 5.

In step S21, in the learning module $100_{L+1}$, the storing unit $111_{L+1}$ stores the learning data supplied to the learning module $100_{L+1}$. The processing proceeds to step S22.

In step S22, the learning device $112_{L+1}$ performs, using the learning data stored in the storing unit $111_{L+1}$, learning of the RNN for updating weight as the model parameter of the RNN.

In step S22, like the learning device $112_{L+1}$, the learning devices $112_1$ to $112_L$ respectively perform learning of the RNN using the learning data stored in the storing units $111_1$ to $111_L$.

The learning of the RNN is performed according to, for example, the BPTT method.

In the learning device $112_{L+1}$, the learning of the RNN is performed, for example, with a random value set as an initial value of the weight.

On the other hand, in the learning devices $112_1$ to $112_L$ in which learning of the RNN was performed in the past, the learning of the RNN is performed, for example, with a random value or the present weight set as an initial value of the weight.

After step S22, the processing proceeds to step S23. The model-parameter sharing unit 120 performs sharing processing for causing all of the L+1 learning modules $100_1$ to $100_{L+1}$ to share all weights $w_1$ to $w_{L+1}$.

When weight as the model parameter of the RNN stored by the learning device $112_i$ of the learning module $100_i$ is represented as $w_i$, the model-parameter sharing unit 120 corrects the weight $w_i$ according to, for example, Formula (3) to thereby cause the learning modules to share all the weights $w_1$ to $w_{L+1}$.

$$w_i = \alpha_i' \cdot w_i + (1 - \alpha_i') \cdot \sum_{j=1}^{L+1} \beta_{ij}' \cdot w_j$$

When the RNN stored by the learning device $112_i$ of the learning module $100_i$ is represented as RNN #i, $\beta_{ij}$ is a coefficient representing a degree of the influence of weight $w_j$ of the RNN #j on weight $w_i$ of RNN #i (i=1, 2, . . . , and L+1) (j=1, 2, . . . , and L+1).

Therefore, summation $\Sigma \beta_{ij}'w_j$ in a second term on the right side of Formula (3) represents a weighted average of weights $w_1$ to $w_{L+1}$ of an RNN #1 to an RNN #L+1 with a coefficient $\beta_{ij}'$ set as weight. $\alpha_i$ is a coefficient representing a degree of the influence of the weighted average $\Sigma \beta_{ij}'w_j$ on the weight $w_i$.

As the coefficients $\alpha_i$ and $\beta_{ij}$, for example, a value larger than 0.0 and smaller than 1.0 can be adopted.

According to Formula (3), as the coefficient $\alpha_i$ is larger, the sharing weakens (the influence of the weighted average $\Sigma\beta_{ij}'w_j$ on the weight $w_i$ decreases) and, as the coefficient $\alpha_i$ is larger, the sharing strengthens.

After step S23, the processing proceeds to step S24. The data processing apparatus shown in FIG. 6 determines whether an end condition for learning is satisfied.

As the end condition for learning in step S24, it is possible to adopt, for example, a condition that the number of times of learning, i.e., the number of times of repetition of steps S22 and S23 reaches a predetermined number of times set in advance or a condition that a prediction error of prediction values output by the RNNs #1 to #L+1 with respect to learning data is equal to or smaller than a predetermined value.

When it is determined in step S24 that the end condition for learning is not satisfied, the processing returns to step S22. Thereafter, the same processing, i.e., the update of the weights $w_1$ to $w_{L+1}$ and the sharing processing are alternately repeated.

When it is determined in step S24 that the end condition for learning is satisfied, the learning processing is finished.

As explained above, the model-parameter sharing unit 120 corrects each of the weights $w_1$ to $w_{L+1}$ of the RNN #1 to the RNN #L+1 on the basis of all the weights $w_1$ to $w_{L+1}$, whereby each of the weights $w_1$ to $w_{L+1}$ is affected by all the weights $w_1$ to $w_{L+1}$. Adjusting (correcting) each of the weighs $w_1$ to $w_{L+1}$ as model parameters to be affected by all the weights $w_1$ to $w_{L+1}$ is sharing of the model parameters.

In the data processing apparatus shown in FIG. 6, in one learning module $100_{i+1}$, learning of the RNN is performed with one (one sequence) time series data, which is obtained when the agent acts according to the error reduction data output by the generating device $113_i$ of the learning module $100_i$, set as learning data. Therefore, in one learning module $100_{i+1}$, since a pattern of one time series data as learning data is stored in the RNN of the learning device $112_{i+1}$ and there is no interference with storage of patterns of RNNs between the learning module $100_{i+1}$ and the other learning modules, stability of the storage is high. The data processing apparatus shown in FIG. 6 is excellent in scalability in that, by adding a learning module, storage of a new pattern can be performed without destroying storage of the learning modules (RNNs) in which patterns are already stored. If the data processing apparatus shown in FIG. 6 is equivalently realized by causing a computer to execute a computer program, the addition of the learning module can be performed by securing a storage area as a learning module anew in a memory (e.g., generation of instance in object-oriented programming).

Further, as explained above, in the data processing apparatus shown in FIG. 6 excellent in scalability, the plural learning modules $100_1$ to $100_{L+1}$ perform learning for updating the model parameter of each of the learning modules $100_1$ to $100_{L+1}$ while sharing the model parameters (weights of the RNNS). Consequently, generalization of storage of patterns is performed in each of the RNNs of the plural learning modules $100_1$ to $100_{L+1}$ Besides, the generalization is also performed in the entire RNNs of the plural learning modules $100_1$ to $100_{L+1}$ As a result, the entire RNNs stored in the plural learning modules $100_1$ to $100_{L+1}$ are equivalently prediction modules having scalability and, at the same time, having the ability of generalization, can acquire (store) large number of patterns, and can acquire generality of plural patterns.

Simulation performed for the data processing apparatus shown in FIG. 1 (hereinafter also referred to as first simulation) is explained.

In the first simulation, a pendulum was adopted as an agent. FIG. 8 is a diagram of a bar-like pendulum as an agent.

The length L of the pendulum as the agent was set to 1 [m] and the mass m thereof was set to 1 [g]. The length L of the pendulum means, with one end of the bar-like pendulum set as a rotation center, a distance between the rotation center and the other end (hereinafter also referred to as the distal end of the pendulum).

A motion (movement) of the pendulum is restricted by an equation of motion indicated by Formula (4).

$$mL^2\theta''=mgL\sin\theta+\mu\theta'+\tau$$

In Formula (4), as shown in FIG. 8, $\theta$ represents a rotation angle [radian] of the pendulum counterclockwise from the direction of the center of gravity. In Formula (4), g represents gravitational acceleration and $\mu$ represents a coefficient of friction. In the first simulation, 9.8 [m/s$^2$] was adopted as the gravitational acceleration g and 0.1 was adopted as the coefficient of friction $\mu$.

In Formula (4), $\tau$ represents torque $\tau$ applied to the pendulum as the agent. $\theta'$ represents differential of the rotation angle $\theta$ (angular velocity) and $\theta''$ represents differential of the differential of the rotation angle (angular acceleration).

In the first simulation, the rotation angle $\theta$ and the angular velocity $\theta'$ of the pendulum were sensor data and the torque $\tau$ that took continuous value was action data.

The torque $\tau$ as the action data was limited to a range from −3 to +3 such that the pendulum could not be swung up (the rotation angel $|\theta|$ was equal to or larger than $\pi$) one time later from a state in which the pendulum stood still ($\theta'=\theta''=\theta$).

A trial (one trial) means performing learning processing for a prediction model using learning data, updating a model parameter of the prediction model, and performing the next learning processing.

In the first simulation, learning processing for a prediction model was performed at every sixty steps by using time series data for sixty steps (sixty times) as learning data.

In the first simulation, planning was performed up to twenty steps ahead at every ten steps.

The planning means setting a target, i.e., determining a target value in step S12 in FIG. 5.

Therefore, performing the planning up to twenty steps ahead means that, when the present time is time t, in step S11 in FIG. 5, with the search length N set to 20, prediction values of time series data for twenty steps at times t+1 to t+20 are calculated from time series data at time t and, in step S12, a target value of time series data at time t+20 is determined.

In this case, in step S15 in FIG. 5, error reduction data for twenty steps at times t to t+20−1 are calculated.

Performing the planning at every ten steps means that, if the time when the present planning is performed is time t, the next planning is performed at time t+10 ten steps (times) later.

Therefore, when the planning is performed up to twenty steps ahead at every ten steps, if the present planning is performed at time t, as explained above, error reduction data for twenty steps at times t to t+20−1 are calculated.

Among the error reduction data at times t to t+20−1, action data as error reduction data at times t+1 to t+10 for ten steps from time t+1 are output to the actuator of the agent. The agent takes an action conforming to the action data.

Prediction values of time series data for twenty steps are calculated again from time series data at time t+10 obtained when the agent acts according to the action data as the error reduction data at times t+1 to t+10 as explained above. Further, a target value of time series data at twenty steps ahead is determined. Thereafter, the same processing is repeated.

In the first simulation, after the last learning processing for a prediction model, when error reduction data for sixty steps are output to the actuator of the agent, i.e., output of error reduction data for ten steps is performed six times, the error reduction data for sixty steps for six times of the output are set as learning data. The present learning processing for a prediction model is performed by using the learning data.

In the first simulation, in step S12 in FIG. 5, a value 1.5 times as large as a prediction value of the rotation angle θ as sensor data was determined as a target value of the rotation angle θ as the sensor data.

Virtually, a motive for an action of the pendulum as the agent was set to higher swing-up of the pendulum. The pendulum swings up highest when the rotation angle θ is −π or +π. Therefore, the target value of the rotation angle θ was limited to a range from −π or +π. In other words, when an absolute value of the value 1.5 times as large as the prediction value of the rotation angle θ was larger than π, the target value of the rotation angle θ was limited such that the absolute value was equal to π.

In the first simulation, the RNN was used as a prediction model.

In the first simulation, concerning learning data as the time series data for sixty steps, an evaluation value val representing a degree of allowing the pendulum as the agent to attain a target was calculated according to Formula (5). Among learning data obtained so far, learning data of five sequences having largest to fifth largest evaluation values val was used for the learning processing for the RNN.

$$val = \sum_{t=0}^{59} 1 - \left(\frac{\cos\theta_t}{2}\right)^2$$

In Formula (5), $\theta_t$ represents the rotation angle θ as sensor data at t+1th step from the start of the learning data as the time series data for sixty steps (t=0, 1, . . . , and 60−1).

The evaluation value val of Formula (5) is larger as a sum for sixty steps of the height of the distal end of the pendulum (height with reference to the position of the distal end at the rotation angle θ of 0) in a state in which the pendulum rotates by the rotation angle θ as the sensor data of the learning data as the time series data for sixty steps. In other words, the evaluation value val is larger as the pendulum swings up higher and the number of times the pendulum swings up high is larger.

In trials until learning data for five sequences were obtained, i.e., trials performed less than five times, all learning data smaller in number than five sequences obtained so far was used for the learning processing for the RNN.

The RNN was caused to learn a pendulum motion at a very small rotation angle θ of the pendulum as the agent. In the learning processing for the RNN in the respective trials, weight calculated in the learning processing for the RNN in the last trial was used.

Figure 9:
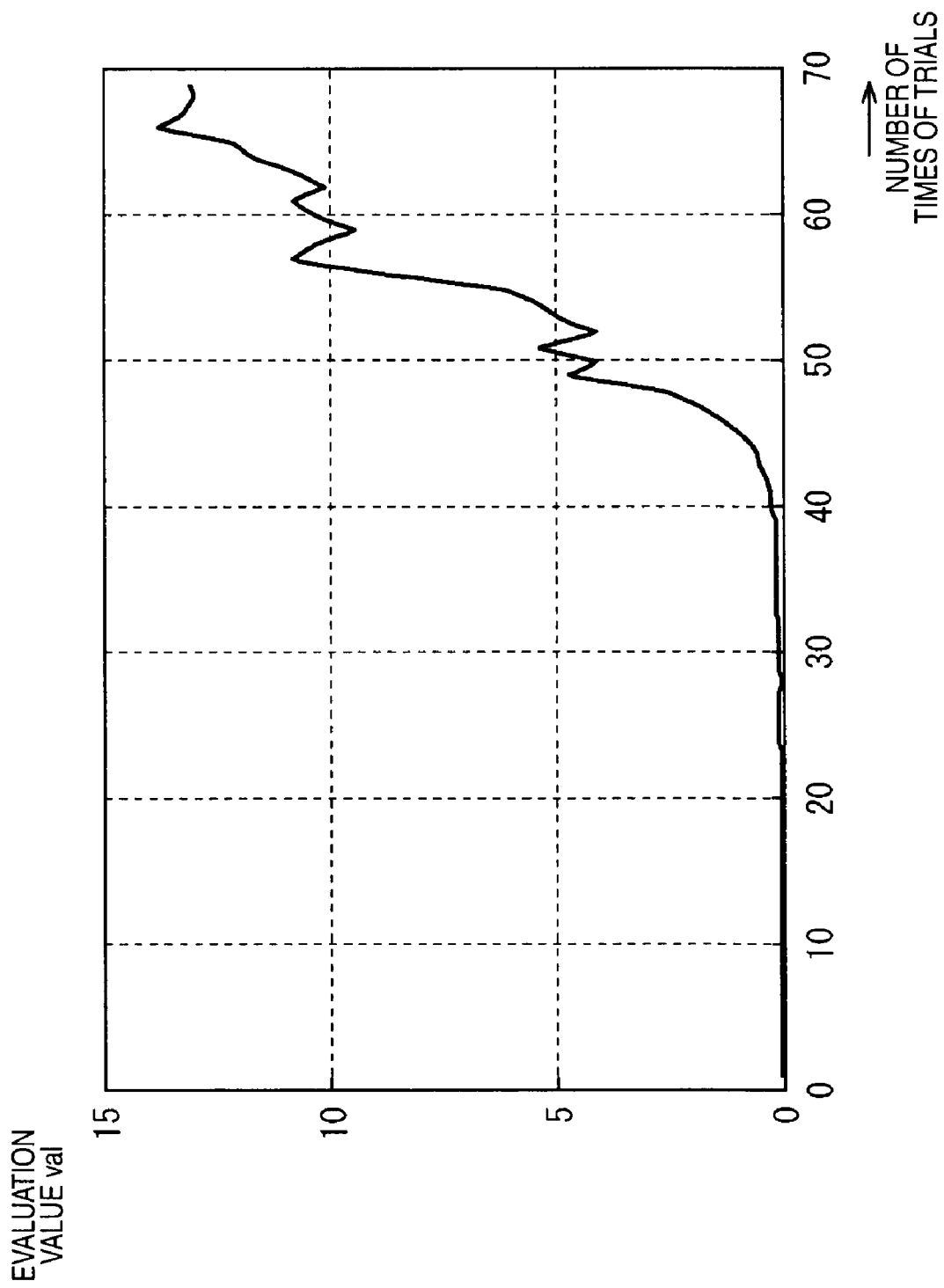
FIG. 9 is a graph of a change in an evaluation value val obtained in a first simulation.

FIG. 9 is a graph of a change in the evaluation value val obtained in the first simulation.

In FIG. 9, the abscissa represents the number of times of trials and the ordinate represents the evaluation value val.

According to FIG. 9, the evaluation value val substantially monotonously increases according to an increase in the number of times of trials. Therefor, it is possible to confirm that search for (a time series of) the torque τ as error reduction data (action data) for causing the pendulum to act is performed with an orientation of swinging up the pendulum higher.

Figure 10:
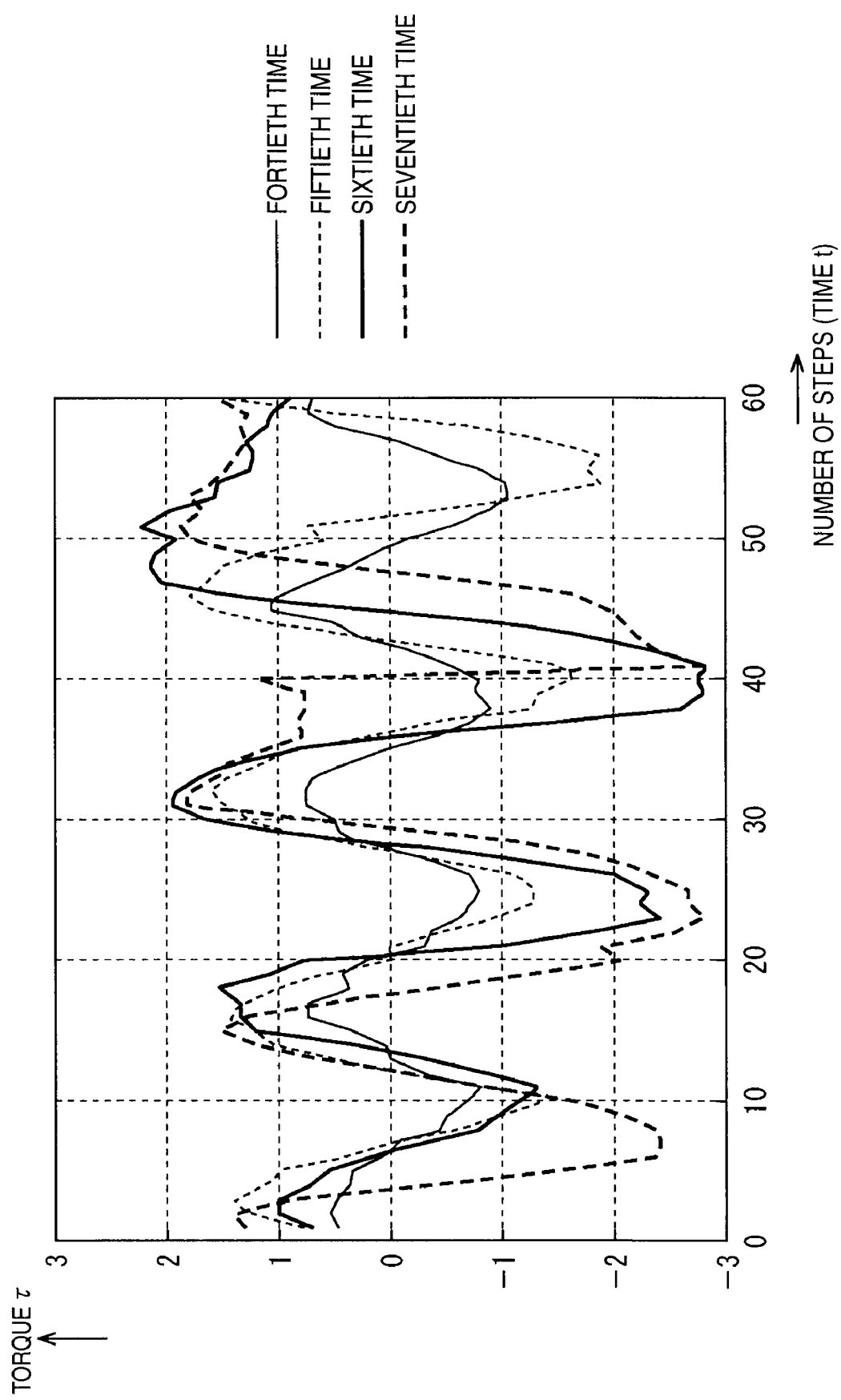
FIG. 10 is a graph of a time series of torque τ as error reduction data obtained in the first simulation.

FIG. 10 is a graph of (a time series of) the torque τ as error reduction data (action data) obtained in the first simulation.

In FIG. 10, the torque τ for sixty steps obtained when the number of times of trials is forty, fifty, sixty, and seventy is shown.

According to FIG. 10, as the number of times of trials increases, the amplitude of the torque τ is larger. Therefore, as the trial proceeds, a target value of the rotation angle θ changes to a value (−π or +π) for swinging up the pendulum higher. As a result, it is possible to confirm that search for the torque τ as error reduction data for swinging up the pendulum higher is performed.

Figure 11:
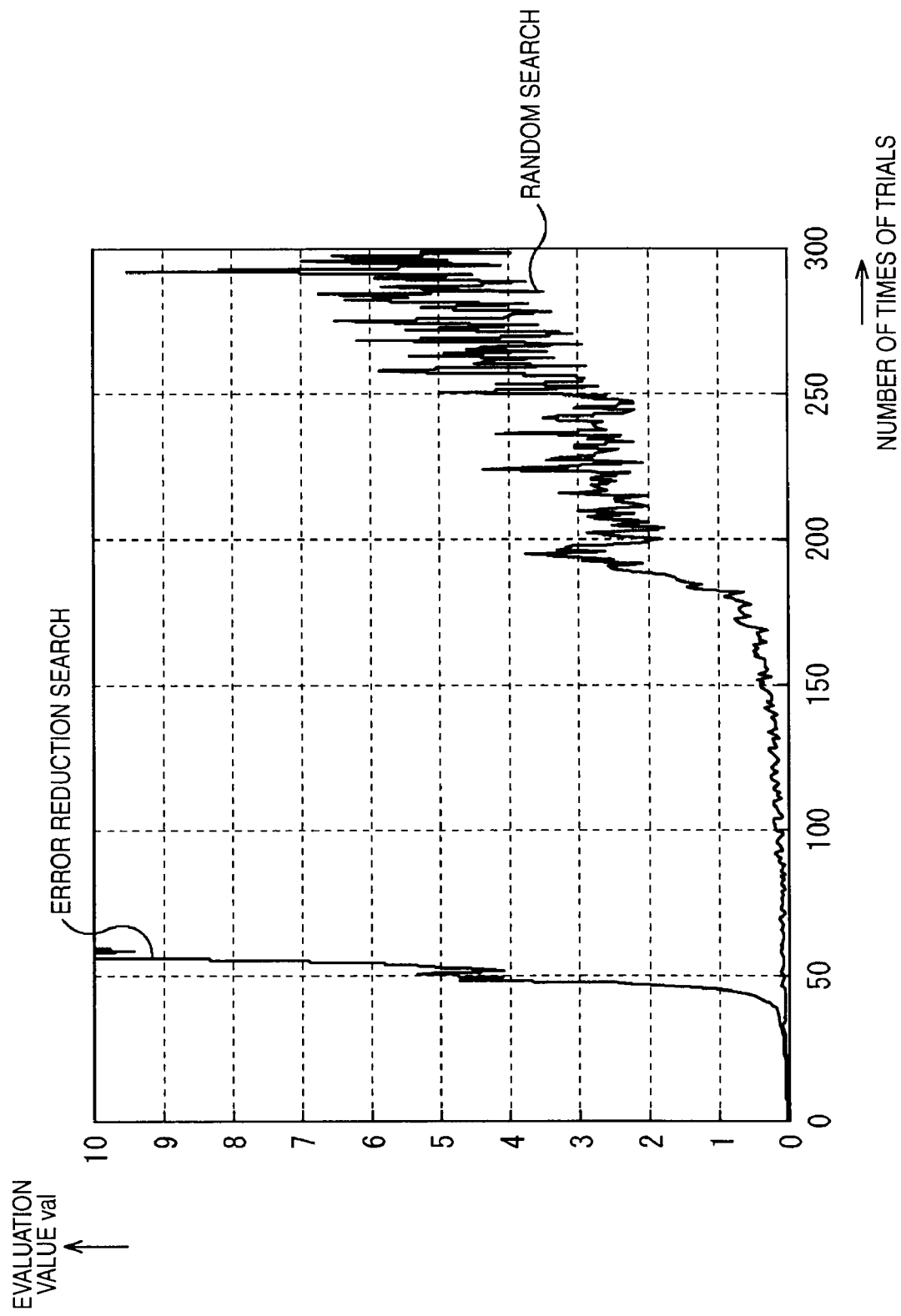
FIG. 11 is a graph of a change in the evaluation value val obtained when the search for the torque τ for swinging up the pendulum high is performed by random search.

In FIG. 11, a change in the evaluation value val when the search for the torque τ for swinging up the pendulum high is performed by random search is shown.

In FIG. 11, the abscissa represents the number of times of trials and the ordinate represents the evaluation value val.

In FIG. 11, the evaluation value val obtained when search for the torque τ (hereinafter also referred to as error reduction search) was performed in the first simulation is also shown.

The evaluation value val in the case of the error reduction search is the same as the evaluation value val shown in FIG. 9.

According to FIG. 11, it is seen that, in the error reduction search, it is possible to improve the evaluation value val with the extremely small number of times of trials compared with the random search, i.e., quickly perform search for the torque τ for swinging up the pendulum higher.

Simulation performed for the data processing apparatus shown in FIG. 6 (hereinafter also referred to as second simulation) is explained.

In the second simulation, a mobile robot that moved on a two-dimensional plane was adopted as an agent and the RNN was used as a prediction model.

Figure 12A:
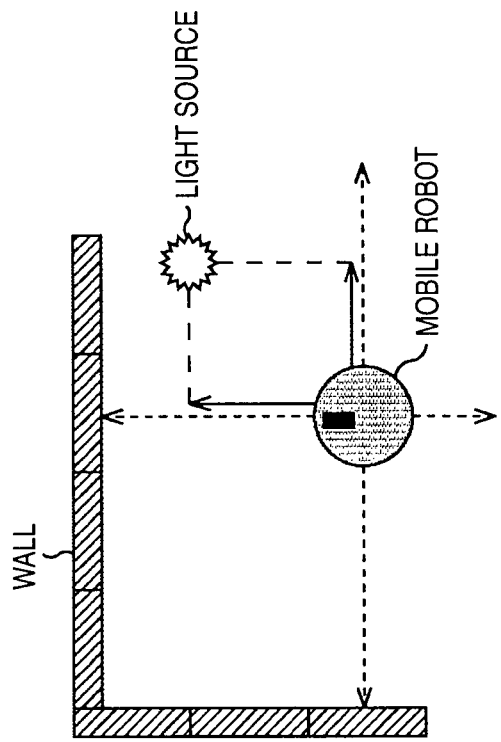
FIGS. 12A and 12B are diagrams of overviews of a mobile robot used in a second simulation and an environment in which the mobile robot moves.
Figure 12B:
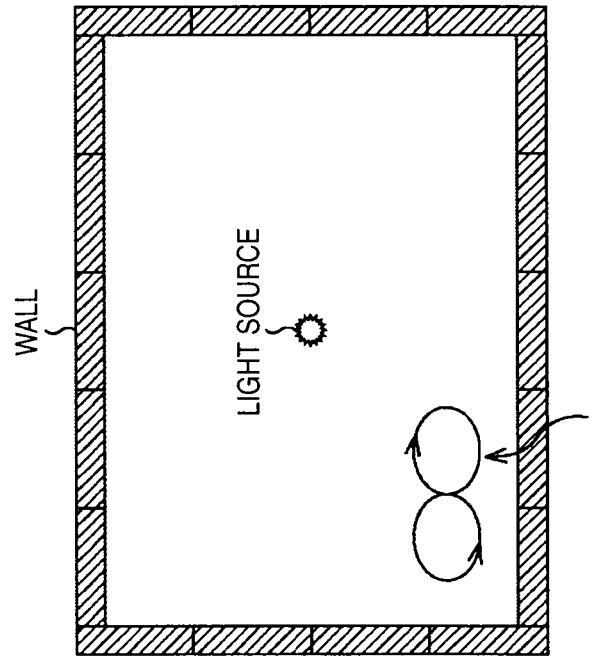

FIGS. 12A and 12B are diagrams of overviews of the mobile robot used in the second simulation and an environment in which the mobile robot moves.

FIG. 12A is a diagram of the environment in which the mobile robot moves (hereinafter also referred to as movement environment).

As the movement environment, a rectangular area surrounded by walls on all sides was prepared and one light source that emitted light was set in the area.

As shown in FIG. 12A, learning data for taking an action of moving to draw a FIG. 8 in the movement environment was stored in the storing unit $111_1$ of the first learning module $100_1$ of the data processing apparatus shown in FIG. 6. Learning of the RNN #1 was performed in advance by using the learning data.

Learning was not performed for the other RNNs #2 to #k.

FIG. 12B is a diagram for explaining sensors of the mobile robot.

The mobile robot has an optical sensor that detects light and outputs a light source position (x,y) as a relative position of a light source, which emits the light, viewed from the mobile robot. The mobile robot also has a distance sensor that measures distances D1, D2, D3, and D4 to the walls on all the sides viewed from the mobile robot and outputs a distance vector (D1,D2,D3,D4) including the distances D1 to D4 as components.

In the second simulation, a change in energy ΔE, which was defined by, for example, Formula (6), calculated from the light source position (x,y) output by the optical sensor and the distance vector (D1,D2,D3,D4) output by the distance sensor was set as sensor data. A movement amount (Δx,Δy) of movement of the mobile robot at one time (one step) was set as action data.

$$\Delta E = (1-d)^2 - \max(D)$$

In Formula (6), d represents a distance between the mobile robot as the agent and the light source and is calculated from the light source position (x,y). max(D) represents a maximum value among the distances D1, D2, D3, and D4 to the respective walls on all the sides and is calculated from the distance vector (D1,D2,D3,D4).

In Formula (6), as both d and max(D), a value normalized to a value in a range from 0 to 1 is used.

In the second simulation, learning processing for the prediction model was performed at every forty steps by using time series data for forty steps (for forty times) as learning data.

Further, in the second simulation, planning was performed up to ten steps ahead at every three steps.

Therefore, in the second simulation, when the present time is time t, in step S11 in FIG. 5, with the search length N set to 10, prediction values of time series data for ten steps at times t+1 to t+10 are calculated from time series data at time t and, in step S12, a target value of time series data at time t+10 is determined.

In step S15 in FIG. 5, error reduction data for ten steps at times t to t+10−1 is calculated and action data as error reduction data at times t+1 to t+3 for three steps from time t+1 is output to the actuator of the agent.

The agent takes an action conforming to the action data, whereby time series data at time t+3 is obtained. In the second simulation, prediction values of time series data for ten steps are calculated from time series data at time t+3 obtained when the agent acts. Further, a target value of time series data ten steps ahead is determined. Thereafter, the same processing is repeated.

In the second simulation, after learning of a certain RNN #i among the RNN #1 to the RNN #K of the learning modules $100_1$ to $100_K$, when error reduction data for forty steps is output to the actuator of the agent, i.e., output of error reduction data for three steps is performed fourteen times, error reduction data for first forty steps among the error reduction data for forty-two (=14×3) steps for the fourteen times of output is set as learning data and learning of an RNN #i+1 is performed.

In the second simulation, in step S12 in FIG. 5, a value 1.5 times as large as a prediction value of a change in energy ΔE as sensor data was determined as a target value of the change in energy ΔE as the sensor data.

In other words, a motive for an action of the mobile robot as the agent was set as moving closer to the light source while moving closer (moving away from) all the walls on all the sides as much as possible.

The change in energy ΔE is large, for example, when the mobile robot is close to the light source and close to (distant from) the walls on all the sides.

Therefore, when the value 1.5 times as larger as the prediction value of the change in energy ΔE is determined as a target value of the change in energy ΔE, the target value is a value for moving the mobile robot closer to the light source and moving the mobile robot closer to (away from) the walls on all the sides.

In the second simulation, a sum of changes in energy ΔE of Formula (6) was adopted as an evaluation value representing a degree of allowing the mobile robot as the agent to attain a target.

Figure 13:
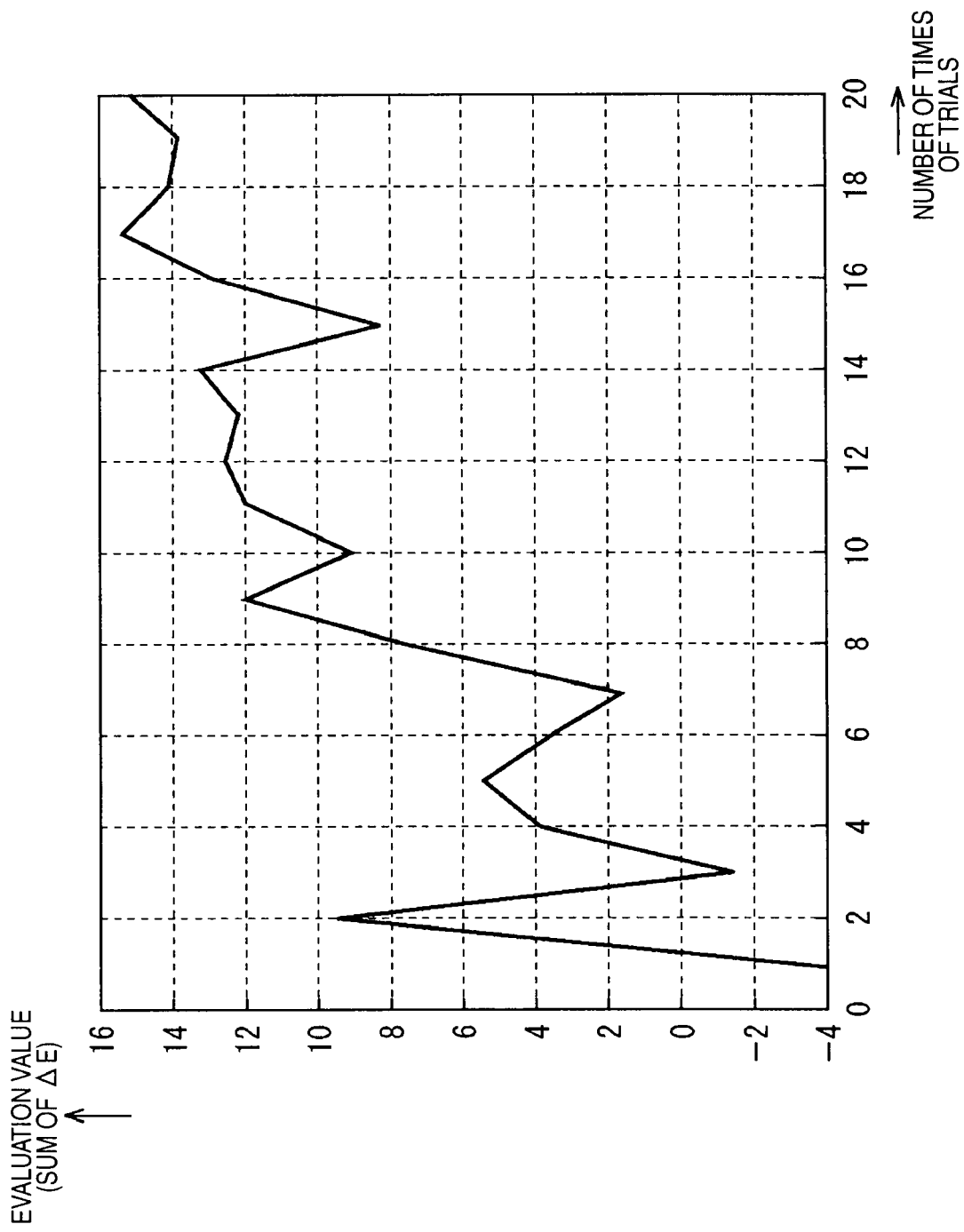
FIG. 13 is a graph of a change in an evaluation value obtained in the second simulation.

FIG. 13 is a graph of a change in an evaluation value obtained in the second simulation.

In FIG. 13, the abscissa represents the number of times of trials and the ordinate represents an evaluation value.

According to FIG. 13, the evaluation value tends to increase according to an increase in the number of times of trials. It is possible to confirm that the mobile robot takes an action for increasing the sum of the changes in energy ΔE.

Figure 14:
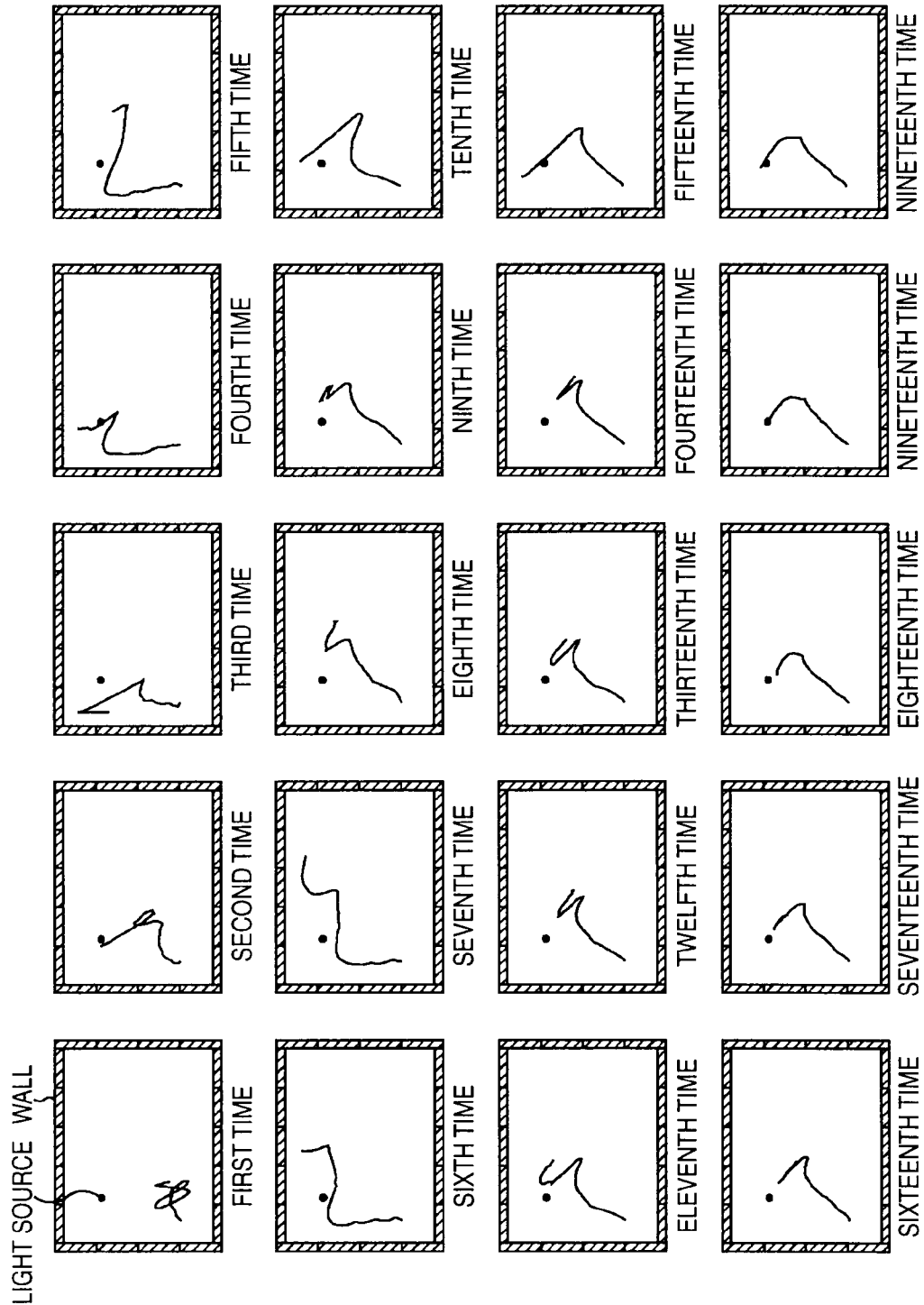
FIG. 14 is a diagram of moving tracks drawn by the mobile robot.

FIG. 14 is a diagram of moving tracks drawn by the mobile robot in respective trials performed twenty times.

According to FIG. 14, as explained with reference to FIGS. 12A and 12B, it is possible to confirm that the mobile robot that learns only an action of drawing a FIG. 8 finds and learns action data (error reduction data) for taking an action for moving closer to the light source and becomes capable of moving closer to the light source.

As shown in FIG. 14, the action of the mobile robot moving closer to the light source was observed regardless of in which of plural positions in the movement environment the mobile robot was set.

According to the first simulation and the second simulation, it is seen that (the prediction model of) the agent learns an action for attaining a target while finding the action. Therefore, it is unnecessary to perform a large amount of learning in advance.

In the first simulation, the target value of the rotation angle θ as the sensor data is limited to the range of −π to +π. Therefore, a final target value of the rotation angle θ is −π or +π.

On the other hand, in the second simulation, the target value of the change in energy ΔE as the sensor data is not specifically limited. Therefore, a final target value of the change in energy ΔE is an unknown value.

As explained above, regardless of whether the final target value is the known value or the unknown value, in the data processing apparatuses shown in FIGS. 1 and 6, it is possible to find action data (error reduction data) for the agent to take an action for attaining a target.

The series of processing explained above can be executed by hardware or can be executed by software. When the series of processing is executed by the software, a computer program configuring the software is installed in a general purpose computer or the like.

Figure 15:
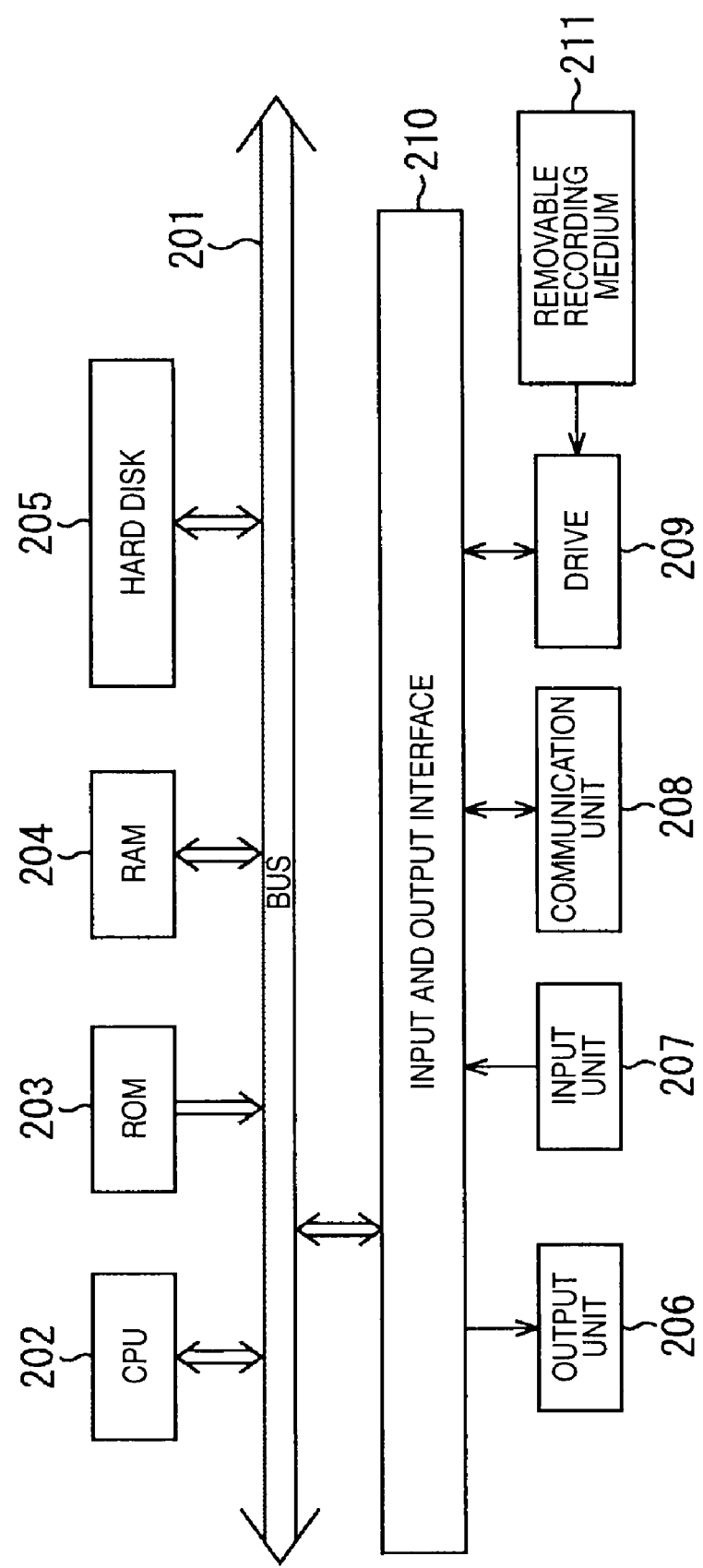
FIG. 15 is a block diagram of a configuration example of a computer according to still another embodiment of the present invention.

FIG. 15 is a diagram of a configuration example of a computer according to still another embodiment of the present invention in which a computer program for executing the series of processing is installed.

The computer program can be recorded in advance in a hard disk 205 and a ROM (Read Only Memory) 203 as recording media incorporated in the computer.

Alternatively, the computer program can be temporarily or permanently stored (recorded) in a removable recording medium 211 such as a flexible disk, a CD-ROM (Compact Disc Read Only Memory), an MO (Magneto Optical) disk, a DVD (Digital Versatile Disc), a magnetic disk, or a semiconductor memory. Such a removable recording medium 211 can be provided as so-called package software.

Besides being installed in the computer from the removable recording medium 211, the computer program can be transferred from a download site to the computer by radio via an artificial satellite for digital satellite broadcast or transferred to the computer by wire via a network such as a LAN (Local Area Network) or the Internet. The computer can receive the computer program transferred in that way in a communication unit 208 and install the computer program in a hard disk 205 incorporated therein.

The computer incorporates a CPU (Central Processing Unit) 202. An input and output interface 210 is connected to the CPU 202 via a bus 201. When a command is input via the input and output interface 210 according to, for example, operation of an input unit 207 including a keyboard, a mouse, and a microphone by a user, the CPU 202 executes the computer program stored in the ROM 203 according to the command. Alternatively, the CPU 202 loads, onto a RAM (Random Access Memory) 204, the computer program stored in the hard disk 205, the computer program transferred from the satellite or the network, received by the communication unit 208, and installed in the hard disk 205, or the computer program read out from the removable recording medium 211 inserted in a drive 209 and installed in the hard disk 205 and executes the computer program. Consequently, the CPU 202 performs processing conforming to the flowcharts explained above or processing performed by the components shown in the block diagrams explained above. According to necessity, the CPU 202 outputs a result of the processing from an output unit 206 including an LCD (Liquid Crystal Display) and a speaker via the input and output interface 210, transmits the processing result from the communication unit 208, or causes the hard disk 205 to, for example, record the processing result.

In this specification, the processing steps describing the computer program for causing the computer to execute various kinds of processing do not always have to be processed in time series according to the order described as the flowcharts and also include processing executed in parallel or individually (e.g., parallel processing or processing by an object).

The computer program may be a computer program processed by one computer or may be a computer program distributedly processed by plural computers. Further, the computer program may be transferred to a remote computer and executed.

Embodiments of the present invention are not limited to the embodiments explained above. Various modifications are possible without departing from the spirit of the present invention.

The present application contains subject matter related to that disclosed in Japanese Priority Patent Application JP 2008-139295 filed in the Japan Patent Office on May 28, 2008, the entire contents of which are hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A data processing apparatus comprising:
   a predicting unit configured to calculate a prediction value of time series data with respect to input of the time series data using a prediction model for predicting the time series data;
   a determining unit configured to determine a target value of the time series data using the prediction value of the time series data;
   an error calculating unit configured to calculate, via a processor, an error of the prediction value relative to the target value; and
   a retrieving unit configured to retrieve and input error reduction data as part of the time series data input into the prediction model to reduce the error of the prediction value.

2. The data processing apparatus according to claim 1, wherein the determining unit determines, as the target value, a function value of a function that takes as an argument the prediction value.

3. The data processing apparatus according to claim 2, further comprising:
   an updating unit configured to update a parameter of the prediction model as learning of the prediction model using the error reduction data.

4. The data processing apparatus according to claim 2, wherein
   the time series data includes action data that causes an agent to act and sensor data representing a state of an environment,
   the determining unit determines a target value of the sensor data, and
   the retrieving unit retrieves, as the error reduction data, the time series data including the action data for reducing an error of the prediction value of the sensor data relative to the target value.

5. The data processing apparatus according to claim 4, wherein the sensor data the state of the environment includes at least one of a photographed image, environment sound, or a distance of the agent from an object.

6. The data processing apparatus according to claim 4, wherein the sensor data further includes a state of the agent.

7. The data processing apparatus according to claim 6, wherein the state of the agent includes at least one of a rotation angle or angular velocity of an actuator of the agent.

8. The data processing apparatus according to claim 4, wherein the target value is determined by using the prediction value of only the sensor data or only the action data.

9. The data processing apparatus according to claim 8, wherein the determining unit determines the target value from a portion of the sensor data or the action data.

10. The data processing apparatus according to claim 2, wherein the prediction model is a function approximator that performs function approximation to approximate a function.

11. The data processing apparatus according to claim 2, wherein the function includes multiplying the predication value by a predetermined multiplier to obtain the target value.

12. The data processing apparatus according to claim 1, wherein the prediction model is a Support Vector Regression.

13. A data processing apparatus comprising:
    predicting means for calculating a prediction value of time series data with respect to input of the time series data using a prediction model for predicting the time series data;
    determining means for determining a target value of the time series data using the prediction value of the time series data;
    error calculating means for calculating an error of the prediction value relative to the target value; and
    retrieving means for retrieving and inputting error reduction data as part of the time series data input into the prediction model to reduce the error of the prediction value.

14. A data processing method comprising the steps of:
    calculating a prediction value of time series data with respect to input of the time series data using a prediction model for predicting the time series data;
    determining a target value of the time series data using the prediction value of the time series data;
    calculating, via a processor, an error of the prediction value relative to the target value; and
    retrieving and inputting error reduction data as part of the time series data input into the prediction model to reduce the error of the prediction value.

15. A non-transitory computer-readable medium storing computer readable instructions thereon that when executed by a data processing apparatus cause the data processing apparatus to perform a method comprising:
  calculating a prediction value of time series data with respect to input of the time series data using a prediction model for predicting the time series data;
  determining a target value of the time series data using the prediction value of the time series data;
  for calculating an error of the prediction value relative to the target value; and
  retrieving and inputting error reduction data as part of the time series data input into the prediction model to reduce the error of the prediction value.

* * * * *